United States Patent
Chu

(10) Patent No.: US 10,111,214 B2
(45) Date of Patent: Oct. 23, 2018

(54) PHYSICAL UPLINK CONTROL CHANNEL RESOURCE ALLOCATION METHOD AND APPARATUS

(71) Applicant: HUAWEI TECHNOLOGIES CO., LTD., Shenzhen, Guangdong (CN)

(72) Inventor: Xunxun Chu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 159 days.

(21) Appl. No.: 15/392,468

(22) Filed: Dec. 28, 2016

(65) Prior Publication Data
US 2017/0111901 A1 Apr. 20, 2017

Related U.S. Application Data

(63) Continuation of application No. PCT/CN2014/081280, filed on Jun. 30, 2014.

(51) Int. Cl.
*H04W 72/04* (2009.01)
*H04L 5/00* (2006.01)
*H04W 28/26* (2009.01)

(52) U.S. Cl.
CPC ......... *H04W 72/0413* (2013.01); *H04L 5/001* (2013.01); *H04L 5/0053* (2013.01);
(Continued)

(58) Field of Classification Search
CPC ............ H04W 72/0413; H04W 72/04; H04W 72/0453; H04W 28/26; H04L 5/001; H04L 5/0053; H04L 5/0016
See application file for complete search history.

(56) References Cited

U.S. PATENT DOCUMENTS

| 9,055,573 | B2* | 6/2015 | Han ................... H04B 7/0689 |
| 9,374,809 | B2 | 6/2016 | Dai et al. |
| 2013/0229998 | A1 | 9/2013 | Noh et al. |
| 2014/0226583 | A1 | 8/2014 | Oizumi et al. |

(Continued)

FOREIGN PATENT DOCUMENTS

| CN | 1722640 A | 1/2006 |
| CN | 101932005 A | 12/2010 |

(Continued)

OTHER PUBLICATIONS

International Search Report dated Mar. 31, 2015 in corresponding International Patent Application No. PCT/CN2014/081280.

(Continued)

*Primary Examiner* — Ian N Moore
*Assistant Examiner* — Brian T Le
(74) *Attorney, Agent, or Firm* — Staas & Halsey LLP

(57) ABSTRACT

The present disclosure discloses a physical uplink control channel resource allocation method and apparatus. The method includes: configuring a PUCCH resource for a PCC, where the PUCCH resource includes at least two PUCCH code channel groups, and each PUCCH code channel group includes at least two PUCCH code channel pairs; determining a PUCCH resource allocated to an SCC, where a same code channel group in the PUCCH resource is allocated to at least two SCCs; and determining code channel pairs used by the SCCs to which the same code channel group in the PUCCH resource is allocated, so that any two SCCs among the SCCs to which the same code channel group in the PUCCH resource is allocated use non-overlapping code channel pairs, so that multiple SCCs share a same PUCCH resource, thereby reducing PUCCH resource consumption, and increasing PUCCH resource utilization, and also increasing an uplink system throughput.

15 Claims, 9 Drawing Sheets

(52) U.S. Cl.
CPC ....... *H04W 72/04* (2013.01); *H04W 72/0453* (2013.01); *H04L 5/0016* (2013.01); *H04W 28/26* (2013.01)

(56) References Cited

U.S. PATENT DOCUMENTS

| | | | |
|---|---|---|---|
| 2015/0146586 A1 | 5/2015 | Takeda et al. | |
| 2015/0319753 A1* | 11/2015 | Chen | H04L 5/001 370/277 |
| 2015/0373695 A1* | 12/2015 | Skarby | H04L 5/0055 370/329 |

FOREIGN PATENT DOCUMENTS

| | | |
|---|---|---|
| CN | 102355733 A | 2/2012 |
| CN | 103826229 A | 5/2014 |
| EP | 2922347 A1 | 9/2015 |
| JP | 2013-239792 | 11/2013 |
| WO | 2013/168341 A1 | 11/2013 |

OTHER PUBLICATIONS

Chinese Office Action dated Nov. 8, 2016 in corresponding Chinese Patent Application No. 201480002164.6.

Extended European Search Report dated May 22, 2017 in corresponding European Patent Application No. 14896405.9.

Nokia Siemens Networks et al.: "Signaling of Implicit ACK/NACK resources", 3GPP Draft; R1-073661, $3^{rd}$ Generation Partnership Project (3GPP), Mobile Competence Centre; 650, Route Des Lucioles; F06921 Sophia-Antipolis Cedex; France vol. RAN WG1, no. Athens, Greece; Aug. 15, 2007.

ETRI: "Resource allocation for PUCCH Format 1b with channel selection", 3GPP Draft; R1-110408, $3^{rd}$ Generation Partnership Project (3GPP), Mobile Competence Centre; 650, Route Des Lucioles; F-06921 Sophia-Antipolis Cedex; France vol. RAN WG1 no. Dublin, Ireland; Jan. 11, 2011.

Nokia Siemens Networks et al.: "Cyclic Shift Hopping and DM RS Signaling", 3GPP Draft; R1-073644, $3^{rd}$ Generation Partnership Project (3GPP), Mobile Competence Centre; 650, Route Des Lucioles; F-06921 Sophia-Antipolis Cedex; France vol. RAN WG1, no. Athens, Greece; Aug. 15, 2007.

"ACK/NACK feedback with channel selection for TDD," Huawei, HiSilicon, 3GPP TSG RAN WG1 Meeting #63, Nov. 15-19, 2010, R1-106152, 5 pgs.

Notice of Allowance dated Apr. 10, 2018, in corresponding Japanese Patent Application No. 2017-519746, 3 pgs.

International Search Report dated Mar. 31, 2015 in corresponding International Application No. PCT/CN2014/081280.

* cited by examiner

| | SCC0 | SCC1 | SCC2 | SCC3 | SCC4 | SCC5 | SCC6 | SCC7 |
|---|---|---|---|---|---|---|---|---|
| Number M of a used code channel group | 0 | 1 | 2 | 3 | 0 | 1 | 2 | 3 |
| Used code channel in a period X | 0(3) | 1(2) | 2(4) | 3(1) | 0(1) | 1(2) | 2(0) | 3(3) |
| Used code channel in a period Y | 0(2) | 1(1) | 2(2) | 3(1) | 0(2) | 1(3) | 2(2) | 3(3) |
| Used code channel in a period Z | 0(1) | 1(1) | 2(3) | 3(1) | 0(3) | 1(3) | 2(1) | 3(3) |

Note: A value N in brackets represents a quantity of code channel pairs

FIG. 6

PHYSICAL UPLINK CONTROL CHANNEL RESOURCE ALLOCATION METHOD AND APPARATUS

CROSS-REFERENCE TO RELATED APPLICATIONS

This application is a continuation of International Application No. PCT/CN2014/081280, filed on Jun. 30, 2014, the disclosure of which is hereby incorporated by reference in its entirety.

TECHNICAL FIELD

The present disclosure relates to the field of wireless communications technologies, and in particular, to a physical uplink control channel resource allocation method and apparatus.

BACKGROUND

In the development process of communications technologies, to increase spectrum resource utilization, a carrier aggregation (CA) technology is introduced to a Long Term Evolution (LTE) communications system.

The CA technology is a technology that acquires higher bandwidth by aggregating multiple continuous or discontinuous Component Carriers (CCs). The multiple aggregated CCs include one Primary Component Carrier (PCC) and at least one Secondary Component Carrier (SCC). A carrier that a UE is initially connected to is a PCC, and other carriers are SCCs.

Feedback information such as acknowledgement (ACK) or negative acknowledgement (NACK) of a downlink transmission block of the SCC can only be fed back over a Physical Uplink Control Channel (PUCCH) of the PCC. However, with the wide deployment of micro base stations, the density of base stations increases. A PCC for which one CC serves as 8 CCs or even more CCs has wide application scenarios. In this case, a demand for a PUCCH resource greatly increases.

For example, currently, to ensure that PUCCH resources used by user equipments on different SCCs do not conflict with each other during SCC scheduling, an independent PUCCH resource needs to be allocated to each SCC. Therefore, as a quantity of SCCs increases, PUCCH resource consumption of a PCC increases linearly. In addition, a PUCCH resource itself is not used for data transmission. In this way, as PUCCH resource consumption increases linearly, an uplink throughput supported by the PCC dramatically decreases, and system performance is deteriorated.

SUMMARY

In view of this, embodiments of the present disclosure provide a PUCCH resource allocation method and apparatus, so as to reduce PUCCH resource consumption.

According to a first aspect of the present disclosure, a resource allocation method is provided, used to allocate a physical uplink control channel PUCCH resource in a component carrier aggregation scenario, where the component carrier includes a primary component carrier PCC and a secondary component carrier SCC, and the method includes:

configuring a PUCCH resource for the PCC, where the PUCCH resource includes at least two PUCCH code channel groups, and each PUCCH code channel group includes at least two PUCCH code channel pairs;

determining a PUCCH resource allocated to the SCC, where a same code channel group in the PUCCH resource configured for the PCC is allocated to at least two SCCs; and determining code channel pairs used by the SCCs to which the same code channel group in the PUCCH resource configured for the PCC is allocated, so that any two SCCs among the SCCs to which the same code channel group in the PUCCH resource configured for the PCC is allocated use non-overlapping code channel pairs.

With reference to the first aspect, in a first possible implementation manner of the first aspect, the determining code channel pairs used by the SCCs to which the same code channel group in the PUCCH resource configured for the PCC is allocated, so that any two SCCs among the SCCs to which the same code channel group in the PUCCH resource configured for the PCC is allocated use non-overlapping code channel pairs includes:

detecting load of the SCCs to which the same code channel group in the PUCCH resource configured for the PCC is allocated;

determining, according to the load of the SCCs to which the same code channel group in the PUCCH resource configured for the PCC is allocated, proportions or quantities of the code channel pairs used by the SCCs to which the same code channel group in the PUCCH resource configured for the PCC is allocated, where an SCC with higher load uses a larger proportion or quantity of code channel pairs; and determining, according to the determined proportions or quantities, the code channel pairs used by the SCCs to which the same code channel group in the PUCCH resource configured for the PCC is allocated, so that any two SCCs among the SCCs to which the same code channel group in the PUCCH resource configured for the PCC is allocated use non-overlapping code channel pairs.

With reference to the first possible implementation manner of the first aspect, in a second possible implementation manner of the first aspect, the detecting load of the SCCs to which the same code channel group in the PUCCH resource configured for the PCC is allocated includes:

detecting periodically the load of the SCCs to which the same code channel group in the PUCCH resource configured for the PCC is allocated.

With reference to the second possible implementation manner of the first aspect, in a third possible implementation manner of the first aspect, the period is one or more transmission time intervals (TTIs).

With reference to the first aspect, in a fourth possible implementation manner of the first aspect, the determining code channel pairs used by the SCCs to which the same code channel group in the PUCCH resource configured for the PCC is allocated, so that any two SCCs among the SCCs to which the same code channel group in the PUCCH resource configured for the PCC is allocated use non-overlapping code channel pairs includes:

allocating equally code channel pairs in the same code channel group to the SCCs to which the same code channel group in the PUCCH resource configured for the PCC is allocated; or when code channel pairs in the same code channel group cannot be equally allocated according to a quantity of the SCCs to which the same code channel group in the PUCCH resource configured for the PCC is allocated, allocating the code channel pairs in the same code channel group to the SCCs, so that a difference between quantities of code channel pairs allocated to the SCCs does not exceed one.

With reference to the first aspect, in a fifth possible implementation manner of the first aspect, the determining code channel pairs used by the SCCs to which the same code channel group in the PUCCH resource configured for the PCC is allocated, so that any two SCCs among the SCCs to which the same code channel group in the PUCCH resource configured for the PCC is allocated use non-overlapping code channel pairs includes:

determining, in each sub-period in one cycle period according to a proportion in a proportion set, that the SCCs to which the same code channel group in the PUCCH resource configured for the PCC is allocated use different code channel pairs in the same code channel group, where a proportion used in each sub-period is different, and a quantity of sub-periods in one cycle period is equal to a quantity of proportions in the proportion set.

With reference to the fifth possible implementation manner of the first aspect, in a sixth possible implementation manner of the first aspect, the sub-period is one or more TTIs.

According to a second aspect of the present disclosure, a resource allocation method is provided, used to allocate a physical uplink control channel PUCCH resource in a component carrier aggregation scenario, where the component carrier includes a primary component carrier PCC and a secondary component carrier SCC, and the method includes:

receiving, by an entity for controlling the SCC, resource information sent by an entity for controlling the PCC, where the resource information is used to indicate a code channel group allocated to the SCC and a code channel pair that is used by the SCC and is in the code channel group, the SCC and other one or more SCCs share the code channel group allocated to the SCC, and the used code channel pair does not overlap with code channel pairs used by the other one or more SCCs;

determining, by the entity for controlling the SCC, a code channel pair that can be used by the SCC and is in the code channel group allocated to the SCC according to the received resource information; and configuring the determined code channel pair for user equipment on the SCC.

According to a third aspect of the present disclosure, a resource allocation apparatus is provided, adapted to allocate a physical uplink control channel PUCCH resource in a component carrier aggregation scenario, where the component carrier includes a primary component carrier PCC and a secondary component carrier SCC, and the apparatus includes:

a configuration unit, adapted to configure a PUCCH resource for the PCC, where the PUCCH resource includes at least two PUCCH code channel groups, and each PUCCH code channel group includes at least two PUCCH code channel pairs;

a first determining unit, adapted to determine a PUCCH resource allocated to the SCC, where a same code channel group in the PUCCH resource configured for the PCC is allocated to at least two SCCs; and a second determining unit, adapted to determine code channel pairs used by the SCCs to which the same code channel group in the PUCCH resource configured for the PCC is allocated, so that any two SCCs among the SCCs to which the same code channel group in the PUCCH resource configured for the PCC is allocated use non-overlapping code channel pairs.

With reference to the third aspect of the present disclosure, in a first possible implementation manner of the third aspect, the apparatus further includes:

a detection unit, adapted to detect load of the SCCs to which the same code channel group in the PUCCH resource configured for the PCC is allocated, where the second determining unit is specifically adapted to determine, according to the load of the SCCs to which the same code channel group in the PUCCH resource configured for the PCC is allocated, proportions or quantities of the code channel pairs used by the SCCs to which the same code channel group in the PUCCH resource configured for the PCC is allocated, where an SCC with higher load uses a larger proportion or quantity of code channel pairs; and determine, according to the determined proportions or quantities, the code channel pairs used by the SCCs to which the same code channel group in the PUCCH resource configured for the PCC is allocated, so that any two SCCs among the SCCs to which the same code channel group in the PUCCH resource configured for the PCC is allocated use non-overlapping code channel pairs.

With reference to the first possible implementation manner of the third aspect, in a second possible implementation manner of the third aspect, the detection unit is specifically adapted to periodically detect the load of the SCCs to which the same code channel group in the PUCCH resource configured for the PCC is allocated.

With reference to the second possible implementation manner of the third aspect, in a third possible implementation manner of the third aspect, the period is one or more TTIs.

With reference to the third aspect, in a fourth possible implementation manner of the third aspect, the second determining unit is specifically adapted to:

equally allocate code channel pairs in the same code channel group to the SCCs to which the same code channel group in the PUCCH resource configured for the PCC is allocated; or when code channel pairs in the same code channel group cannot be equally allocated according to a quantity of the SCCs to which the same code channel group in the PUCCH resource configured for the PCC is allocated, allocate the code channel pairs in the same code channel group to the SCCs, so that a difference between quantities of code channel pairs allocated to the SCCs does not exceed one.

With reference to the third aspect, in a fifth possible implementation manner of the third aspect, the second determining unit is specifically adapted to:

determine, in each sub-period in one cycle period according to a proportion in a proportion set, that the SCCs to which the same code channel group in the PUCCH resource configured for the PCC is allocated use different code channel pairs in the same code channel group, where a proportion used in each sub-period is different, and a quantity of sub-periods in one cycle period is equal to a quantity of proportions in the proportion set.

With reference to the fifth possible implementation manner of the third aspect, in a sixth possible implementation manner of the third aspect, the sub-period is one or more TTIs.

According to a fourth aspect of the present disclosure, a resource allocation apparatus is provided, adapted to allocate a physical uplink control channel PUCCH resource in a component carrier aggregation scenario, where the component carrier includes a primary component carrier PCC and a secondary component carrier SCC, and the apparatus is located in an entity for controlling the SCC and includes:

an interface unit, adapted to receive resource information sent by an entity for controlling the PCC, where the resource information is used to indicate a code channel group allocated to the SCC and a code channel pair that is used by the SCC and is in the code channel group, the SCC and other one or more SCCs share the code channel group allocated to the SCC, and the used code channel pair does not overlap with code channel pairs used by the other one or more SCCs;

a determining unit, adapted to determine a code channel pair that can be used by the SCC and is in the code channel group allocated to the SCC according to the received resource information; and a configuration unit, adapted to configure the determined code channel pair for user equipment on the SCC.

According to a fifth aspect of the present disclosure, a resource allocation apparatus is provided, adapted to allocate a physical uplink control channel PUCCH resource in a component carrier aggregation scenario, where the component carrier includes a primary component carrier PCC and a secondary component carrier SCC, and the apparatus includes:

a memory, adapted to store application program code;

a processor, adapted to execute the application program code stored in the memory, and specifically execute:

configuring a PUCCH resource for the PCC, where the PUCCH resource includes at least two PUCCH code channel groups, and each PUCCH code channel group includes at least two PUCCH code channel pairs;

determining a PUCCH resource allocated to the SCC, where a same code channel group in the PUCCH resource configured for the PCC is allocated to at least two SCCs; and determining code channel pairs used by the SCCs to which the same code channel group in the PUCCH resource configured for the PCC is allocated, so that any two SCCs among the SCCs to which the same code channel group in the PUCCH resource configured for the PCC is allocated use non-overlapping code channel pairs; and an interface, adapted to transmit information between the memory and the processor.

With reference to the fifth aspect, in a first possible implementation manner of the fifth aspect, the processor is specifically adapted to execute:

detecting load of the SCCs to which the same code channel group in the PUCCH resource configured for the PCC is allocated;

determining, according to the load of the SCCs to which the same code channel group in the PUCCH resource configured for the PCC is allocated, proportions or quantities of the code channel pairs used by the SCCs to which the same code channel group in the PUCCH resource configured for the PCC is allocated, where an SCC with higher load uses a larger proportion or quantity of code channel pairs; and determining, according to the determined proportions or quantities, the code channel pairs used by the SCCs to which the same code channel group in the PUCCH resource configured for the PCC is allocated, so that any two SCCs among the SCCs to which the same code channel group in the PUCCH resource configured for the PCC is allocated use non-overlapping code channel pairs.

With reference to the first possible implementation manner of the fifth aspect, in a second possible implementation manner of the fifth aspect, the processor is specifically adapted to execute detecting periodically the load of the SCCs to which the same code channel group in the PUCCH resource configured for the PCC is allocated.

With reference to the second possible implementation manner of the fifth aspect, in a third possible implementation manner of the fifth aspect, the period is one or more TTIs.

With reference to the fifth aspect, in a fourth possible implementation manner of the fifth aspect, the processor is specifically adapted to execute:

allocating equally code channel pairs in the same code channel group to the SCCs to which the same code channel group in the PUCCH resource configured for the PCC is allocated; or when code channel pairs in the same code channel group cannot be equally allocated according to a quantity of the SCCs to which the same code channel group in the PUCCH resource configured for the PCC is allocated, allocating the code channel pairs in the same code channel group to the SCCs, so that a difference between quantities of code channel pairs allocated to the SCCs does not exceed one.

With reference to the fifth aspect, in a fifth possible implementation manner of the fifth aspect, the processor is specifically adapted to execute:

determining, in each sub-period in one cycle period according to a proportion in a proportion set, that the SCCs to which the same code channel group in the PUCCH resource configured for the PCC is allocated use different code channel pairs in the same code channel group, where a proportion used in each sub-period is different, and a quantity of sub-periods in one cycle period is equal to a quantity of proportions in the proportion set.

With reference to the fifth possible implementation manner of the fifth aspect, in a sixth possible implementation manner of the fifth aspect, the sub-period is one or more TTIs.

According to a sixth aspect of the present disclosure, a resource allocation apparatus is provided, adapted to allocate a physical uplink control channel PUCCH resource in a component carrier aggregation scenario, where the component carrier includes a primary component carrier PCC and a secondary component carrier SCC, and the apparatus is located in an entity for controlling the SCC and includes:

an interface, adapted to receive resource information sent by an entity for controlling the PCC, where the resource information is used to indicate a code channel group allocated to the SCC and a code channel pair that is used by the SCC and is in the code channel group, the SCC and other one or more SCCs share the code channel group allocated to the SCC, and the used code channel pair does not overlap with code channel pairs used by the other one or more SCCs;

a memory, adapted to store application program code; and a processor, adapted to execute the application program code stored in the memory, and specifically execute:

determining a code channel pair that can be used by the SCC and is in the code channel group allocated to the SCC according to the received resource information; and configuring the determined code channel pair for user equipment on the SCC.

In the embodiments of the present disclosure, a PUCCH resource is configured for a PCC, where the PUCCH resource includes at least two PUCCH code channel groups, and each PUCCH code channel group includes at least two PUCCH code channel pairs; a PUCCH resource allocated to an SCC is determined, where a same code channel group in the PUCCH resource configured for the PCC is allocated to at least two SCCs; and code channel pairs used by the SCCs to which the same code channel group in the PUCCH resource configured for the PCC is allocated are determined, so that any two SCCs among the SCCs to which the same code channel group in the PUCCH resource configured for the PCC is allocated use non-overlapping code channel pairs. In this way, the PUCCH resource configured for the PCC is allocated to the SCC by means of a PUCCH code channel group; and the same code channel group in the PUCCH resource configured for the PCC is allocated to the at least two SCCs, and any two SCCs among the SCCs to which the same code channel group in the PUCCH resource configured for the PCC is allocated use non-overlapping code channel pairs, so that multiple SCCs share a same PUCCH resource, and PUCCH resources are reduced during CA performed by the multiple CCs with each other, and PUCCH resource consumption is reduced. This not only increases PUCCH resource utilization, but also increases an uplink system throughput.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

FIG. 6 is a schematic diagram of resource sharing among SCCs according to an embodiment of the present disclosure;

DESCRIPTION OF EMBODIMENTS

Figure 1:
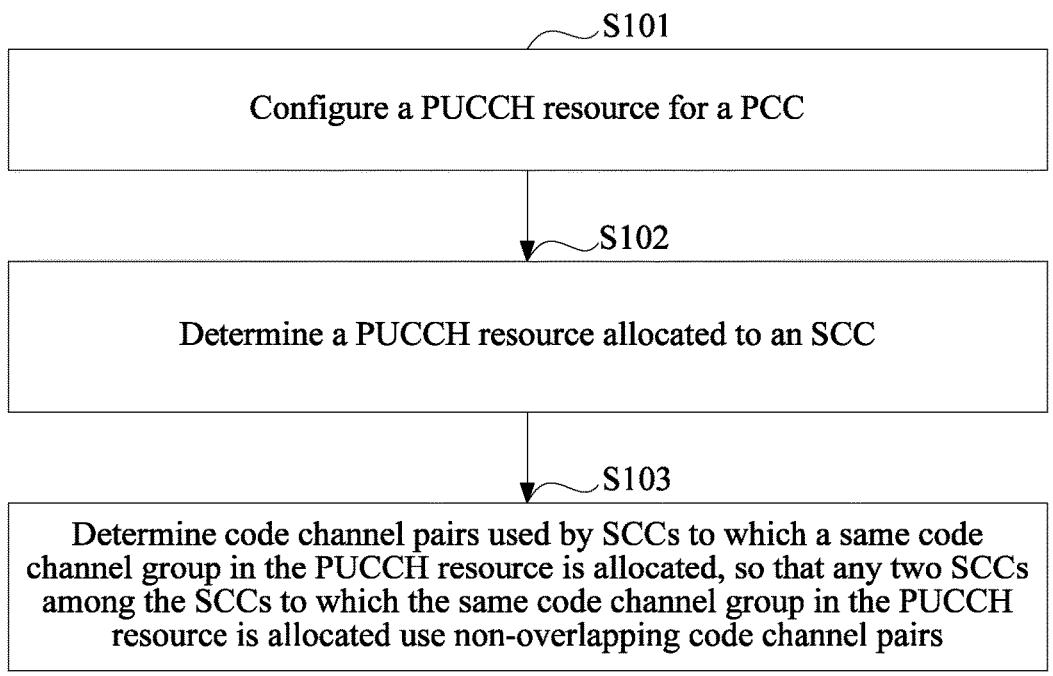
FIG. 1 is a schematic flowchart of a resource allocation method according to an embodiment of the present disclosure.

Currently, CC schedulers are commonly deployed in a communications system by means of distributed deployment. For example, the CC schedulers are located in different base stations or different baseband boards on a same base station. In this way, in a scheduling process, it is rather difficult for the CC schedulers to coordinate resources in real time. Therefore, to avoid a conflict between PUCCH resources used by user equipments on different SCCs, an independent PUCCH resource is allocated to each SCC in the prior art. As a result, PUCCH resource consumption of a PCC increases linearly as a quantity of SCCs increases. In consideration of the foregoing problem, a policy that SCCs share a same PUCCH resource is put forward in embodiments of this application, so as to reduce PUCCH resource consumption and increase an uplink throughput.

For example, a PUCCH resource configured for the PCC may be divided into multiple PUCCH code channel groups (code channel group for short below), and each code channel group includes multiple PUCCH code channel pairs (code channel pair for short below). When the PCC is aggregated with multiple SCCs, a same code channel group is allocated to at least two SCCs, and resources, of the SCCs to which the same code channel group is allocated, in the code channel group are controlled not to conflict, which may be implemented by controlling the SCCs to which the same code channel group is allocated to use different code channel pairs in the same code channel group. That the SCCs to which the same code channel group is allocated use different code channel pairs refers to that any one of the code channel pairs is different, that is, the code channel pairs used by these SCCs do not overlap. In this way, different SCCs can share a same PUCCH code channel group resource, which reduces PUCCH resource consumption when multiple CCs perform CA with each other, and increases an uplink throughput.

Allocation of a code channel group to an SCC may be implemented at a Layer 3 (L3), for example, implemented at an Radio Resource Control (RRC) layer. Controlling the SCCs to which the same code channel group is allocated to use different code channel pairs in the same code channel group may be implemented at a Layer 2 (L2), for example, implemented at an Radio Link Control (RLC) layer or a Media Access Control (MAC) layer. Certainly, the present disclosure is not limited thereto, and persons skilled in the art may adjust, according to a requirement, a location for implementing each step.

The following describes the embodiments of the present disclosure in detail with reference to the accompanying drawings in the specification. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

FIG. 1 is a schematic flowchart of a resource allocation method according to an embodiment of the present disclosure. The method may be described as follows:

The resource allocation method provided by this embodiment of the present disclosure may be applied to PUCCH resource allocation in a component carrier aggregation scenario, where the component carrier includes a PCC and an SCC.

Generally, the PCC is a carrier that UE is initially connected to.

S101: Configure a PUCCH resource for the PCC.

The PUCCH resource includes at least two PUCCH code channel groups (where the PUCCH code channel group is briefly referred to as a code channel group below), and each PUCCH code channel group includes at least two PUCCH code channel pairs (where the PUCCH code channel pair is briefly referred to as a code channel pair below).

S102: Determine a PUCCH resource allocated to the SCC.

A same code channel group in the PUCCH resource configured for the PCC is allocated to at least two SCCs.

S103: Determine code channel pairs used by SCCs to which a same code channel group in the PUCCH resource configured for the PCC is allocated, so that any two SCCs among the SCCs to which the same code channel group in the PUCCH resource configured for the PCC is allocated use non-overlapping code channel pairs.

In step S103, manners of determining the code channel pairs used by the SCCs to which the same code channel group in the PUCCH resource configured for the PCC is allocated, so that any two SCCs among the SCCs to which the same code channel group in the PUCCH resource configured for the PCC is allocated use non-overlapping code channel pairs include, but are not limited to, the following several types:

First manner: For a same code channel group, a code channel pair that can be used is allocated according to a load status of an SCC.

Step 1: Detect load of the SCCs to which the same code channel group in the PUCCH resource configured for the PCC is allocated.

Specifically, the load of the SCCs to which the same code channel group in the PUCCH resource configured for the PCC is allocated is detected periodically.

The period is one or more transmission time intervals (TTIs).

Step 2: Determine, according to the load of the SCCs to which the same code channel group in the PUCCH resource configured for the PCC is allocated, proportions or quantities of the code channel pairs used by the SCCs to which the same code channel group in the PUCCH resource configured for the PCC is allocated.

An SCC with higher load uses a larger proportion or quantity of code channel pairs.

Step 3: Determine, according to the determined proportions or quantities, the code channel pairs used by the SCCs to which the same code channel group in the PUCCH resource configured for the PCC is allocated, so that any two SCCs among the SCCs to which the same code channel group in the PUCCH resource configured for the PCC is allocated use non-overlapping code channel pairs.

Second manner: For a same code channel group, a code channel pair that can be used is allocated to an SCC according to the principle of equal allocation.

Specifically, code channel pairs in the same code channel group are equally allocated to the SCCs to which the same code channel group in the PUCCH resource configured for the PCC is allocated; or when code channel pairs in the same code channel group cannot be equally allocated according to a quantity of the SCCs to which the same code channel group in the PUCCH resource configured for the PCC is allocated, the code channel pairs in the same code channel group are allocated to the SCCs, so that a difference between quantities of code channel pairs allocated to the SCCs does not exceed one.

Third manner: For a same code channel group, a code channel pair that can be used is allocated to an SCC in each sub-period in one cycle period according to a set proportion.

Specifically, it is determined, in each sub-period in one cycle period according to a proportion in a proportion set, that the SCCs to which the same code channel group in the PUCCH resource configured for the PCC is allocated use different code channel pairs in the same code channel group.

A proportion used in each sub-period is different, and a quantity of sub-periods in one cycle period is equal to a quantity of proportions in the proportion set.

The sub-period is one or more TTIs.

By using the solution in this embodiment of the present disclosure, a PUCCH resource is configured for a PCC, where the PUCCH resource includes at least two PUCCH code channel groups, and each PUCCH code channel group includes at least two PUCCH code channel pairs; a PUCCH resource allocated to an SCC is determined, where a same code channel group in the PUCCH resource configured for the PCC is allocated to at least two SCCs; and code channel pairs used by the SCCs to which the same code channel group in the PUCCH resource configured for the PCC is allocated are determined, so that any two SCCs among the SCCs to which the same code channel group in the PUCCH resource configured for the PCC is allocated use non-overlapping code channel pairs. In this way, the PUCCH resource configured for the PCC is allocated to the SCC by means of a PUCCH code channel group; and the same code channel group in the PUCCH resource configured for the PCC is allocated to the at least two SCCs, and any two SCCs among the SCCs to which the same code channel group in the PUCCH resource configured for the PCC is allocated use non-overlapping code channel pairs, so that multiple SCCs share a same PUCCH resource, and PUCCH resources are reduced during CA performed by the multiple CCs with each other, and PUCCH resource consumption is reduced. This not only increases PUCCH resource utilization, but also increases an uplink system throughput.

Figure 2:
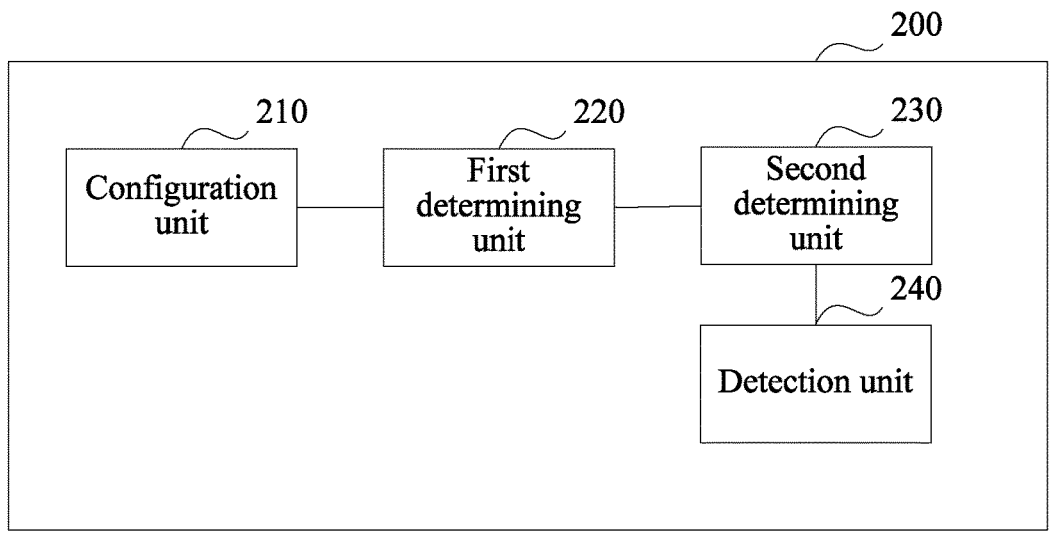
FIG. 2 is a schematic structural diagram of a resource allocation apparatus according to an embodiment of the present disclosure.

FIG. 2 is a schematic structural diagram of a resource allocation apparatus 200 according to an embodiment of the present disclosure.

The resource allocation apparatus provided by this embodiment of the present disclosure may be applied to PUCCH resource allocation in a component carrier aggregation scenario, where the component carrier includes a PCC and an SCC.

The apparatus 200 includes: a configuration unit 210, a first determining unit 220, and a second determining unit 230.

The configuration unit 210 is adapted to configure a PUCCH resource for the PCC, where the PUCCH resource includes at least two PUCCH code channel groups, and each PUCCH code channel group includes at least two PUCCH code channel pairs.

The first determining unit 220 is adapted to determine a PUCCH resource that is allocated to the SCC and configured by the configuration unit 210, where a same code channel group in the PUCCH resource configured for the PCC is allocated to at least two SCCs.

The second determining unit 230 is adapted to determine code channel pairs used by the SCCs to which the same code channel group in the PUCCH resource configured for the PCC is allocated, so that any two SCCs among the SCCs to which the same code channel group in the PUCCH resource configured for the PCC is allocated use non-overlapping code channel pairs.

In another embodiment of the present disclosure, the apparatus further includes a detection unit 240.

The detection unit 240 is adapted to detect load of the SCCs to which the same code channel group in the PUCCH resource configured for the PCC is allocated; and the second determining unit 230 is specifically adapted to determine, according to the load, which is detected by the detection unit 240, of the SCCs to which the same code channel group in the PUCCH resource configured for the PCC is allocated, proportions or quantities of the code channel pairs used by the SCCs to which the same code channel group in the PUCCH resource configured for the PCC is allocated, where an SCC with higher load uses a larger proportion or quantity of code channel pairs; and determine, according to the determined proportions or quantities, the code channel pairs used by the SCCs to which the same code channel group in the PUCCH resource configured for the PCC is allocated, so that any two SCCs among the SCCs to which the same code channel group in the PUCCH resource configured for the PCC is allocated use non-overlapping code channel pairs.

Optionally, the detection unit 240 is specifically adapted to periodically detect the load of the SCCs to which the same code channel group in the PUCCH resource configured for the PCC is allocated.

Optionally, the period is one or more TTIs.

In another embodiment of the present disclosure, the second determining unit 230 is specifically adapted to:

equally allocate code channel pairs in the same code channel group to the SCCs to which the same code channel group in the PUCCH resource configured for the PCC is allocated; or when code channel pairs in the same code channel group cannot be equally allocated according to a quantity of the SCCs to which the same code channel group in the PUCCH resource configured for the PCC is allocated, allocate the code channel pairs in the same code channel group to the SCCs, so that a difference between quantities of code channel pairs allocated to the SCCs does not exceed one.

In another embodiment of the present disclosure, the second determining unit 230 is specifically adapted to:

determine, in each sub-period in one cycle period according to a proportion in a proportion set, that the SCCs to which the same code channel group in the PUCCH resource configured for the PCC is allocated use different code channel pairs in the same code channel group, where a proportion used in each sub-period is different, and a quantity of sub-periods in one cycle period is equal to a quantity of proportions in the proportion set.

Optionally, the sub-period is one or more TTIs.

The resource allocation apparatus in this embodiment of the present disclosure may be located in a base station in which a PCC is located, and to be more specific, may be in a baseband board, which controls the PCC, in the base station. A PUCCH resource configured for a PCC is allocated to an SCC by means of a PUCCH code channel group; and a same code channel group in the PUCCH resource configured for the PCC is allocated to at least two SCCs, and any two SCCs among the SCCs to which the same code channel group in the PUCCH resource configured for the PCC is allocated use non-overlapping code channel pairs, so that multiple SCCs share a same PUCCH resource, and PUCCH resources are reduced during CA performed by the multiple CCs with each other, and PUCCH resource consumption is reduced. This not only increases PUCCH resource utilization, but also increases an uplink system throughput.

Figure 3:
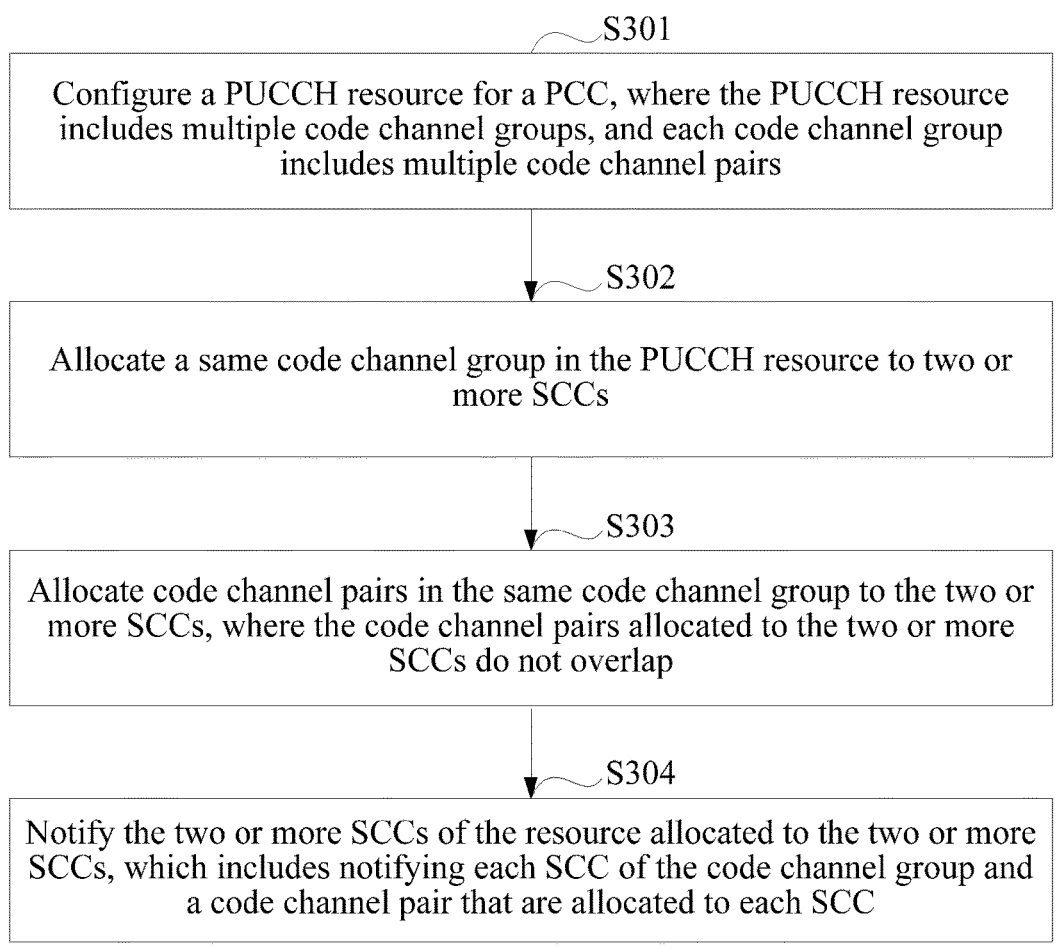
FIG. 3 is a schematic flowchart of a PUCCH resource allocation method according to an embodiment of the present disclosure.

FIG. 3 is a schematic flowchart of a PUCCH resource allocation method according to an embodiment of the present disclosure. The method is used to allocate a PUCCH resource in a CA scenario. In the CA scenario, one PCC is aggregated with at least two SCCs, and feedback information of a downlink transmission block sent by each SCC is fed back over a PUCCH of the PCC. Therefore, a PUCCH resource configured for the PCC needs to be allocated to the SCCs aggregated with the PCC for use. The method provided by this embodiment is used to resolve a problem of how to effectively use a PUCCH resource during the resource allocation. As shown in FIG. 3, the PUCCH resource allocation method provided by this embodiment may include the following steps:

S301: Configure a PUCCH resource for the PCC, where the PUCCH resource includes multiple code channel groups, and each code channel group includes multiple code channel pairs.

S302: Allocate a same code channel group in the PUCCH resource configured for the PCC to two or more SCCs.

S303: Allocate code channel pairs in the same code channel group to the two or more SCCs, where the code channel pairs allocated to the two or more SCCs do not overlap.

S304: Notify the two or more SCCs of the resource allocated to the two or more SCCs, which includes notifying each SCC of the code channel group and a code channel pair that are allocated to each SCC.

Resource allocation in step S302 is performed on a per-code channel group basis, and the same code channel group is allocated to the two or more SCCs, so that the two or more SCCs share the same code channel group, thereby reducing PUCCH resource consumption during aggregation of the PCC and the multiple SCCs, and increasing an uplink throughput. In addition, because the shared code channel group exists, resource allocation in step S303 is further performed on a per-code channel pair, so that the SCCs that share the same code channel group use different code channel pairs, thereby avoiding a resource conflict.

The foregoing method may be performed by an entity for controlling the PCC. The entity may be a base station in which the PCC is located, and to be more specific, may be a baseband board, which controls the PCC, in the base station, and to be further specific, may further be a processor on the baseband board. The processor herein may be one processor, or may be a collective name of multiple processing elements.

In step S301, configuration of the PUCCH resource for the PCC may be implemented at a Layer 3. Resource blocks (RBs) configured for a PUCCH are limited. To increase PUCCH time-frequency resource utilization, a time-frequency resource is extended in an encoding dimension, so that a PUCCH resource is identified by using a carrier (a frequency dimension), a timeslot (a time dimension), and encoding (an encoding dimension). The unit of a PUCCH resource may be considered as a PUCCH code channel. Because each subframe includes two timeslots, in actual use, resource division may be performed on a PUCCH resource on a per-code channel pair basis, so that the PUCCH resource includes multiple code channel groups, and each code channel group includes multiple code channel pairs. The multiple herein refers to two or more. Because each code channel group has multiple code channel pairs, when multiple SCCs share one code channel group, these SCCs can use different code channel pairs.

After the PUCCH resource is configured for the PCC, in a process of allocating these resources to the SCCs aggregated with the PCC, step S302 may be performed. For example, the PUCCH resource may be allocated to the SCCs aggregated with the PCC, so as to achieve a goal that a code channel group is shared by as few SCCs as possible. When a quantity of the SCCs aggregated with the PCC is less than a quantity of code channel groups in the PUCCH resource, one code channel group may be allocated to each SCC aggregated with the PCC. In this case, no code channel group is shared. When the quantity of the SCCs aggregated with the PCC is greater than the quantity of the code channel groups in the PUCCH resource, step S302 is performed. Further, when the quantity of the SCCs aggregated with the PCC is greater than the quantity of the code channel groups in the PUCCH resource, and less than twice the quantity of the code channel groups in the PUCCH resource, allocation of the same code channel group in the PUCCH resource configured for the PCC to only two SCCs in step S302 may be further performed.

In addition, the same code channel group may be simultaneously allocated to the two or more SCCs, or the same code channel group may also be successively allocated to the two or more SCCs.

It is assumed that the PUCCH resource configured for the PCC is divided into four code channel groups, which are code channel groups 1 to 4. For example, when connected user equipment (UE) requires four or less SCCs to be aggregated with the PCC, one code channel group may be allocated to each SCC, and a code channel group may not be shared first. Then, when a quantity of SCCs that need to be aggregated exceeds the quantity of the code channel groups, an allocated code channel group may be reallocated to a newly added SCC. Certainly, an aggregation policy may also be used at the beginning, and two or more SCCs share one code channel group. When an SCC that needs to be aggregated is newly added subsequently, an unallocated code channel group is used; and if there is no unallocated code channel group, sharing may continue.

For another example, when connected UE requires more than four SCCs to be aggregated with the PCC, and for ease of description, five SCCs are used as an example herein and are SCC0 to SCC4. In this case, a same code channel group such as the code channel group 1 may be simultaneously allocated to the SCC0 and the SCC4. Certainly and alternatively, the code channel groups 1 to 4 may be sequentially allocated to the SCC0 to the SCC3, and the code channel group 1 may be then allocated to the SCC4, which is not limited in this embodiment of the present disclosure.

It should be noted that a quantity of code channel pairs in each code channel group may be the same, or may be different, which is not limited herein.

In step S303, for an SCC that shares the same code channel group, resource allocation of the SCC needs to be further divided into on a per-code channel pair bias to avoid a resource conflict. Manners for specifically implementing allocation of a code channel pair may include, but are not limited to, any one of the following manners:

First Manner: A Manner of Allocation According to a Requirement.

Code channel pairs in the code channel group are allocated to these SCCs according to load of the SCCs that share the same code channel group. An SCC with higher load uses more code channel pairs; a relationship between load and a code channel pair herein may not be a simple linear relationship, and a relationship between a load range and a required code channel pair may be determined according to empirical values of load and the required code channel pair in daily use. For example, load may be divided into several intervals, and each interval needs a different quantity of code channel pair. When load reaches the interval, a corresponding quantity of code channel pairs are allocated to the SCC. For another example, several threshold intervals may alternatively be set according to empirical values of load and a required code channel pair in daily use, and each threshold interval corresponds to one allocation proportion of code channel pairs. When a difference between load of two SCCs falls within a threshold interval, a code channel pair is allocated to each SCC according to a corresponding allocation proportion.

For example, assuming that two SCCs share one code channel group, and the code channel group has four code channel pairs, the code channel pairs in the code channel group need to be allocated to the two SCCs, and all possible allocation manners include: manner 1: three code channel pairs are allocated to one SCC, and one code channel pair is allocated to the other SCC; manner 2: two code channel pairs are allocated to each SCC; manner 3: four code channel pairs are allocated to one SCC, and the other SCC reserves permission to use the code channel group, but temporarily does not use the code channel group. Manner 1 is applied to a case in which load of two SCCs differs by a value or is in two different load intervals; manner 2 is applied to a case in which load of two SCCs is the same, or has a small difference (for example, the difference is less than a threshold), or is in a same load interval; manner 3 is applied to a case in which load of one SCC is 0or may be ignored relative to load of the other SCC.

When two SCCs share one code channel group, and the code channel group includes four code channel pairs, in a simplest implementation manner, that is, when load of the two SCCs is the same or a difference thereof is less than a preset value, manner 2 is used to allocate two code channel pairs to each SCC; or when load of the two SCCs is different or a difference thereof is greater than a preset value, manner 1 is used to allocate three code channel pairs to an SCC with higher load and allocate one code channel pair to an SCC with less load. When load of an SCC is 0(including a case in which the load of the SCC may be ignored relative to load of the other SCC), manner 3 is used to allocate all the four code channel pairs to the SCC having load.

Another example of an implementation manner may include that: The SCC0 and the SCC4 share one code channel group, and the code channel group has four code channel pairs. Because load of the SCC0 falls within a load interval of three code channel pairs, and load of the SCC4 falls within a load interval of one code channel pair, manner 1 is used to allocate three code channel pairs to the SCC0, and allocate one code channel pair to the SCC4. For another example, because a difference between load of the SCC0 and load of the SCC4 falls within a threshold interval, and an allocation proportion corresponding to the threshold interval is 3:1, manner 1 is used to allocate three code channel pairs to the SCC0, and allocate one code channel pair to the SCC4.

In the foregoing method, a resource requirement of an SCC that shares the same code channel group is considered, and a code channel pair is allocated according to the requirement, thereby further increasing PUCCH resource utilization, and further increasing an uplink throughput.

It should be noted that the manners for allocating a code channel pair provided above are merely for exemplary purpose, and are not intended to limit the present disclosure. Persons skilled in the art may use, according to this reminder, other manners for allocating, according to load, a code channel pair to an SCC that shares the same code channel group, or control, according to another parameter that reflects a resource requirement of an SCC except the load, allocation of a code channel pair to an SCC that shares the same code channel group, which is not limited in this embodiment of the present disclosure.

Second Manner: An Equal Allocation Manner.

In this manner, a resource requirement of an SCC that shares the same code channel group is not considered, and code channel pairs in the code channel group are equally allocated to the SCCs according to a quantity of the SCCs that share the same code channel group.

For example, assuming that two SCCs share one code channel group, and the code channel group has four code channel pairs, the code channel pairs in the code channel group are equally allocated to the two SCCs, that is, each SCC uses two code channel pairs.

When the code channel pairs in the code channel group cannot be equally allocated according to the quantity of the SCCs that share the same code channel group, a difference between quantities of code channel pairs used by the SCCs may be made not to exceed one. For example, when a quantity of the SCCs that share one code channel group is 3 in the foregoing example, two SCCs among the SCCs both use one code channel pair, and another SCC uses two code channel pairs.

Third Allocation Manner: A Cyclic Allocation Manner.

In this manner, it is considered that different SCCs may have different resource requirements, but during allocation, a code channel pair is not allocated according to a resource requirement of an SCC that shares the same code channel group, and several allocation manners are sequentially used in a cyclic manner to achieve the effect of allocating equally a resource in one cycle period.

For example, assuming that the SCC0 and the SCC4 share a code channel group 1, and the code channel group 1 has four code channel pairs, during initial allocation, three code channel pairs are allocated to the SCC0, and one code channel pair is allocated to the SCC4; after a period of time, two code channel pairs are allocated to the SCC0, and two code channel pairs are allocated to the SCC4; and after a same period of time, one code channel pair is allocated to the SCC1, and three code channel pairs are allocated to the SCC4. This process is repeated, and resources allocated to the SCC0 and the SCC4 in each cycle period are equal. The period of time herein may use a transmission time interval (TTI) as a unit, and is, for example, one or more TTIs. Certainly, other time units may also be set.

Figure 4:
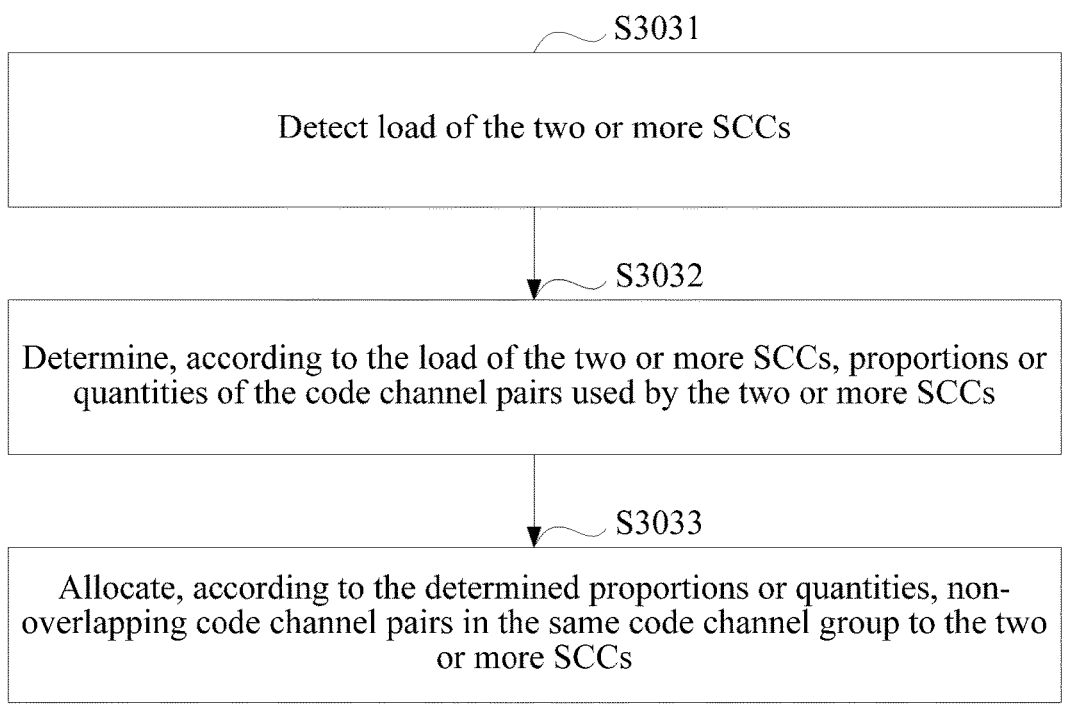
FIG. 4 is a schematic flowchart of a code channel pair allocation manner according to an embodiment of the present disclosure.

Refer to FIG. 4, which is a schematic flowchart of a code channel pair allocation manner according to an embodiment of the present disclosure. For the first allocation manner, step S303 may include:

S3031: Detect load of the two or more SCCs.

S3032: Determine, according to the load of the two or more SCCs, proportions or quantities of the code channel pairs used by the two or more SCCs.

S3033: Allocate, according to the determined proportions or quantities, non-overlapping code channel pairs in the same code channel group to the two or more SCCs.

For the second allocation manner, step S303 may include: equally allocating the code channel pairs in the same code channel group to the two or more SCCs; or when code channel pairs in the same code channel group cannot be equally allocated according to the quantity of the two or more SCCs, removing a remaining quantity of code channel pairs, equally allocating other code channel pairs to the two or more SCCs, and then allocating the remaining quantity of code channel pairs to a remaining quantity of SCCs, so that a difference between quantities of code channel pairs allocated to the SCCs does not exceed one.

For the third allocation manner, step S303 may include: allocating, in each sub-period in one cycle period according to a proportion in a proportion set, different code channel pairs in the same code channel group to the two or more SCCs, where a proportion used in each sub-period is different, and a quantity of sub-periods in one cycle period is equal to a quantity of proportions in the proportion set. The proportion set may be set according to a quantity of the code channel pairs in the code channel group, for example, all possible proportions may be listed exhaustively, and all or some of the proportions are selected as the set. An example in which each code channel group includes four code channel pairs is used, and proportions included in the set may be 1:3, 1:1, and 3:1.

The third allocation manner is an implementation manner of periodically adjusting allocation of a code channel pair. For the first and second allocation manners, after initial allocation is performed by using either one of the first and second allocation manners, the load of these SCCs may also be detected in each period; and if the load changes, whether to adjust the quantities of the code channel pairs allocated to the SCCs may be considered.

Figure 5:
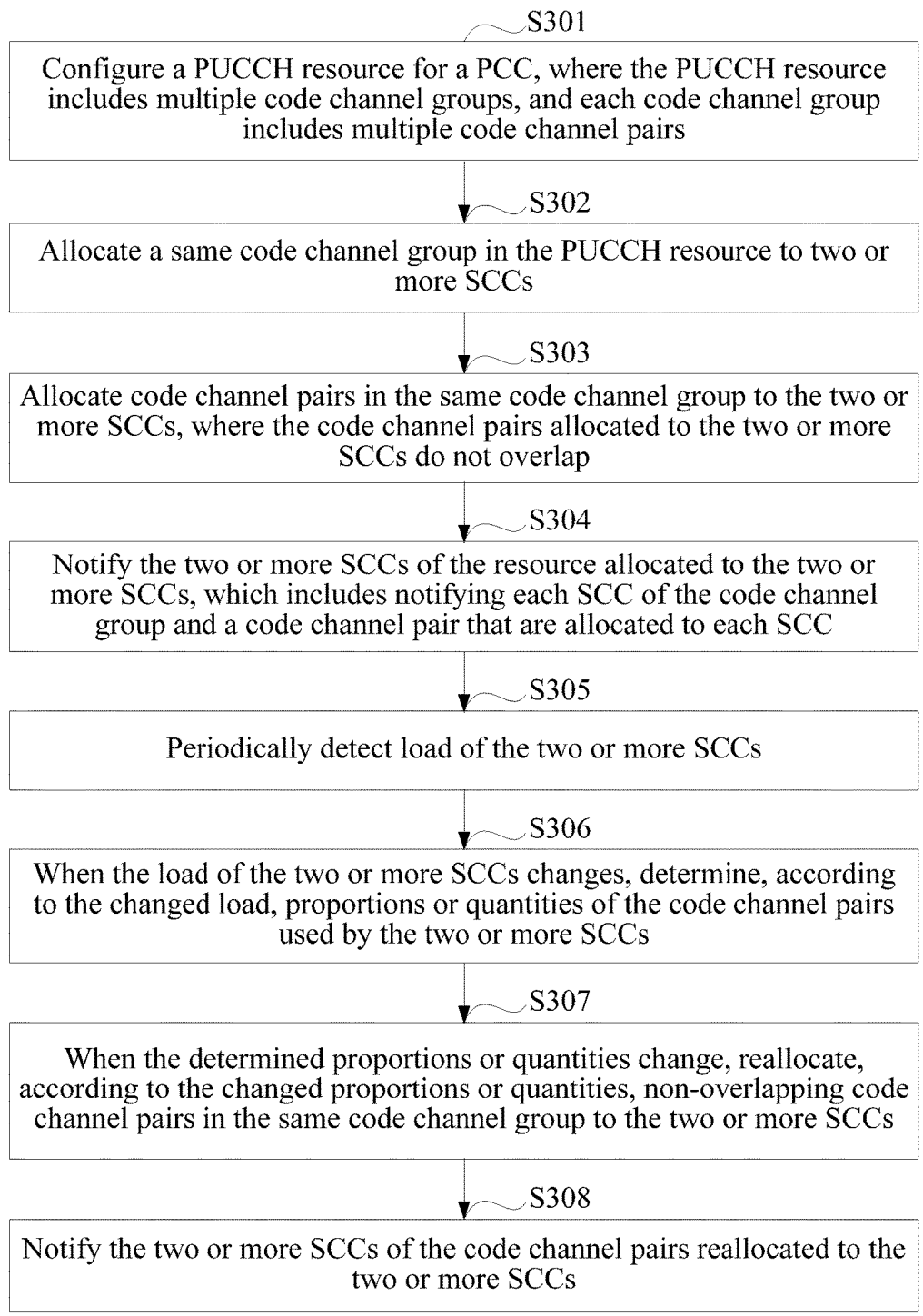
FIG. 5 is a schematic flowchart of another PUCCH resource allocation method according to an embodiment of the present disclosure.

Specifically, refer to FIG. 5, which is a schematic flowchart of another PUCCH resource allocation method according to an embodiment of the present disclosure. Relative to the foregoing embodiment, in this embodiment, after the code channel pairs are allocated to the two or more SCCs, whether to reallocate a code channel pair to each SCC may be determined periodically. In this case, the method further includes:

S305: Periodically detect load of the two or more SCCs.

S306: When the load of the two or more SCCs changes, determine, according to the changed load, proportions or quantities of the code channel pairs used by the two or more SCCs.

S307: When the determined proportions or quantities change, reallocate, according to the changed proportions or quantities, non-overlapping code channel pairs in the same code channel group to the two or more SCCs.

S308: Notify the two or more SCCs of the code channel pairs reallocated to the two or more SCCs.

For example, when two SCCs share one code channel group, and the code channel group includes four code channel pairs, for example, the SCC0 and the SCC4 share one code channel group, and the load of the SCC0 is initially greater than the load of the SCC4 or the difference between the load of the SCC0 and the load of the SCC4 is greater than a preset value, three code channel pairs are allocated to the SCC0, and one code channel pair is allocated to the SCC4. After the detection, the load of the SCC4 is greater than the load of the SCC0 or a difference between the load of the SCC4 and the load of the SCC0 is greater than a preset value, one code channel pair is reallocated to the SCC0, and three code channel pairs are allocated to the SCC4. The initial allocation is the same as that described above in the manner of allocation according to a requirement in step S303, the allocation manner after the detection is the same as the initial allocation manner, and all possible manners are not described herein again.

For another example, when a quantity of code channel pairs is determined according to a load interval, it is assumed that the SCC0 and the SCC4 share one code channel group, and the code channel group has four code channel pairs. Initially, because the load of the SCC0 falls within a load interval of three code channel pairs, and the load of the SCC4 falls within a load interval of one code channel pair, and after the detection, the load of the SCC0 and the load of the SCC4 both falls within a load interval of two code channel pairs, two code channel pairs are reallocated to the SCC0, and the other two code channel pairs are allocated to the SCC4. Alternatively, although only the load of the SCC0 falls within the load interval of two code channel pairs, and the load interval of the SCC4 does not change after the detection, two code channel pairs may also be allocated to the SCC0. In this case, for a quantity of remaining code channel pairs, three code channel pairs cannot be sufficiently allocated to the SCC4, and only two code channel pairs may be allocated to the SCC4. That is, allocation of a code channel pair herein only needs to be satisfied as much as possible.

For another example, when a quantity of code channel pairs is determined according to a correspondence between a threshold interval and an allocation proportion, it is assumed that because the difference between the load of the SCC0 and the load of the SCC4 initially falls within a first threshold interval, an allocation proportion of code channel pairs of the SCC0 and the SCC4 is 3:1. After the detection, the difference between the load of the SCC0 and the load of the SCC4 falls within a second threshold interval, so that the allocation proportion of the code channel pairs of the SCC0 and the SCC4 is 1:1, a same quantity of code channel pairs are reallocated to the SCC0 and the SCC4.

The period in step S305 uses a TTI as a unit, and may be one or more TTIs.

In the foregoing method, resource allocation can be adjusted in time according to a load change of an SCC, so that PUCCH resource utilization is further increased, and an uplink throughput is further increased.

To better visualize the foregoing methods, a case in which a PUCCH resource is allocated is described below with reference to FIG. 6. FIG. 6 is a schematic diagram of resource sharing among SCCs according to an embodiment of the present disclosure. The meaning of M (N) in the figure is that M represents a group number of a code channel group allocated to an SCC, and N represents a quantity of code channel pairs allocated to the SCC, that is, M represents the group number of the code channel group used by the SCC, and N represents the quantity of the code channel pairs used by the SCC.

In the figure, an example in which a PCC may be aggregated with eight SCCs is used, and the eight SCCs are SCC0 to SCC7. A PUCCH resource configured for the PCC is divided into four code channel groups, which are code channel groups 0 to 3, and each code channel group includes four code channel pairs. Two SCCs share one code channel group, which includes that the SCC0 and the SCC4 share the code channel group 0, the SCC1 and the SCC5 share the code channel group 1, the SCC2 and the SCC6 share the code channel group 2, and the SCC3 and the SCC7 share the code channel group 3. Two SCCs that share a same code channel group use non-overlapping code channel pairs in a same period. For example, the SCC0 uses 3 code channel pairs within a period X, and the SCC4 uses one remaining code channel pair within the period X; the SCC1 uses two code channel pairs within the period X, and the SCC5 uses two remaining code channel pairs within the period X; the SCC2 uses four code channel pairs within the period X, and the SCC6 reserves permission to use the code channel group 2 in the period X, but uses no code channel pair; and the SCC3 uses one code channel pair within the period X, and the SCC7 uses three remaining code channel pairs within the period X. In addition, a proportion of code channel pairs used by two SCCs that share the same code channel group may be adjusted in each period. Only the SCC0 and the SCC4 are used as an example, and other SCCs are not described in detail again. In the period X, the SCC0 uses three code channel pairs, and the SCC4 uses one remaining code channel pair; in a period Y, the SCC0 uses two code channel pairs, and the SCC4 uses two remaining code channel pairs; and in a period Z, the SCC0 uses one code channel pair, and the SCC4 uses three remaining code channel pairs. The adjustment herein may be performed according to load of the SCC0 and load of the SCC4, and a specific process thereof is the same as that in the foregoing corresponding description, and details are not provided herein again.

It is already mentioned above that after a PUCCH resource is configured for a PCC, in a process of allocating these resources to SCCs aggregated with the PCC, step S302 and step S303 may be performed. For an SCC that does not share a code channel group, the SCC only needs to be notified of information about a code channel group; and for SCCs that share a code channel group, these SCCs need to be notified of information about the code channel group and code channel pairs.

After receiving a notification of the PCC, each SCC may determine, according to the notification of the PCC, PUCCH resources that can be used by the SCC, and then allocate these resources to UE on the SCC, so that the UE sends, by using the allocated PUCCH resources, feedback information of a downlink transmission block sent by the SCC.

Figure 7:
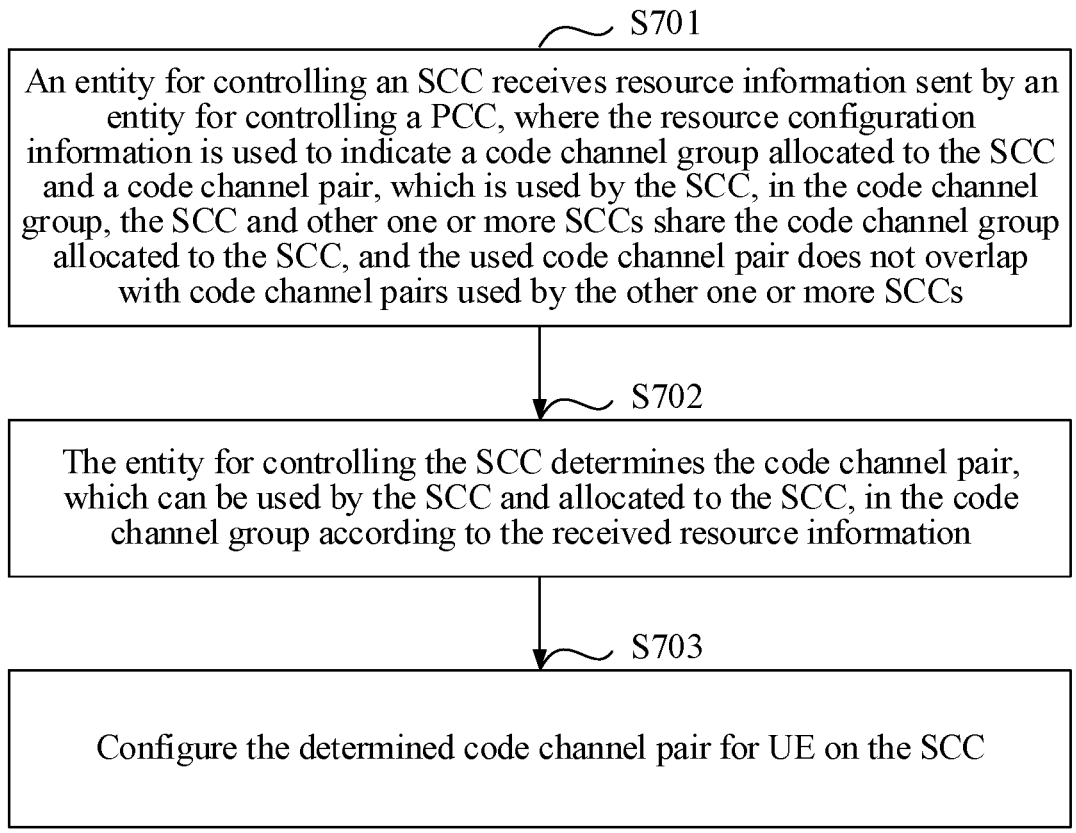
FIG. 7 is a schematic flowchart of a PUCCH resource allocation method according to an embodiment of the present disclosure.

Specifically, refer to FIG. 7, which is a schematic flowchart of a PUCCH resource allocation method according to an embodiment of the present disclosure. The method is used to allocate a PUCCH resource in a CA scenario. In the CA scenario, one PCC is aggregated with at least two SCCs, and feedback information of a downlink transmission block sent by each SCC is fed back over a PUCCH of the PCC. Therefore, a PUCCH resource configured for the PCC needs to be allocated to the SCCs aggregated with the PCC for use. The PUCCH resource configured for the PCC includes multiple code channel groups, and each code channel group includes multiple code channel pairs. As shown in FIG. 7, the PUCCH resource allocation method provided by this embodiment may include the following steps:

S701: An entity for controlling an SCC receives resource information sent by an entity for controlling a PCC, where the resource information is used to indicate a code channel group allocated to the SCC and a code channel pair that is used by the SCC and is in the code channel group, the SCC and other one or more SCCs share the code channel group allocated to the SCC, and the used code channel pair does not overlap with code channel pairs used by the other one or more SCCs.

S702: The entity for controlling the SCC determines a code channel pair that can be used by the SCC and is in the code channel group allocated to the SCC according to the received resource information.

S703: Configure the determined code channel pair for UE on the SCC.

The entity for controlling the SCC may be a base station in which the SCC is located, and to be more specific, may be a baseband board, which controls the SCC, in the base station, and to be further specific, may further be a processor on the baseband board. The processor herein may be one processor, or may be a collective name of multiple processing elements.

In step S701, if the PCC and the SCC are deployed in different base stations, resource information may be transmitted by using an interface such as an X2 interface between the base stations; and if the PCC and the SCC are deployed in different baseband boards or processors of a same base station, resource information may be transmitted by using a cabling connection between the baseband boards or processors.

In addition, a form of the resource information is not limited in this embodiment of the present disclosure, and an existing message may be used to carry the resource information, or a message may also be newly set to transmit the resource information. Content is not limited either herein as long as information about a code channel group and a code channel pair that are allocated to each SCC by the PCC can be notified to the SCC. For example, a code channel group and code channel pair may be identified by sequence numbers, and sequence numbers of a corresponding code channel group and code channel pair may be transmitted in the resource information.

In this way, in step S702, the entity for controlling the SCC can know, according to the resource information, resources that can be used by the SCC, and configure these resources for the UE on the SCC. A process of configuring, by the SCC, a resource for the UE is irrelevant to the essence of the present disclosure, and may be implemented by using an existing configuration method, and details are not provided herein again.

It should be noted that the SCCs aggregated with the PCC may change. For example, at a time, all UEs that are connected to the PCC require an SCC0 to an SCC3 to be aggregated; in this case, the PCC needs to be aggregated with the SCC0 to the SCC3. Then, because the connected UEs change, SCCs that need to be aggregated increase, for example, the PCC needs to be aggregated with the SCC0 to an SCC7; or SCCs that need to be aggregated change, for example, the PCC needs to be aggregated with the SCC4 to an SCC7; or SCCs that need to be aggregated change and a quantity increases, for example, PCC needs to be aggregated with an SCC8 to an SCC14. For CA, it is usually set a maximum quantity of SCCs that the PCC can be aggregated with, but in actual use, aggregated SCCs may change at different times, and a quantity of the SCCs may also change. When the quantity of the aggregated SCCs is not greater than a quantity of the code channel groups in the resource configured for the PCC, an independent code channel group may be allocated to each SCC; in this case, a resource allocation granularity may be a code channel group. When the quantity of the aggregated SCCs exceeds the quantity of the code channel groups in the resource configured for the PCC, a same code channel group may be allocated to different SCCs to implement PUCCH resource sharing; in this case, a resource allocation granularity needs to be further divided into a code channel pair in a code channel group to avoid a resource conflict. Certainly, when the quantity of the aggregated SCCs does not exceed the quantity of the code channel groups in the resource configured for the PCC, the same code channel group may also be allocated to different SCCs to implement PUCCH resource sharing, which is not limited in this embodiment of the present disclosure.

It can be seen that not all SCCs among the SCCs aggregated with the PCC share a code channel group with another SCC, and a case of resource allocation to an SCC that shares a code channel group is described in the foregoing embodiments. An SCC that does not share a code channel group may independently use a code channel group, and details are not provided herein again.

Figure 8:
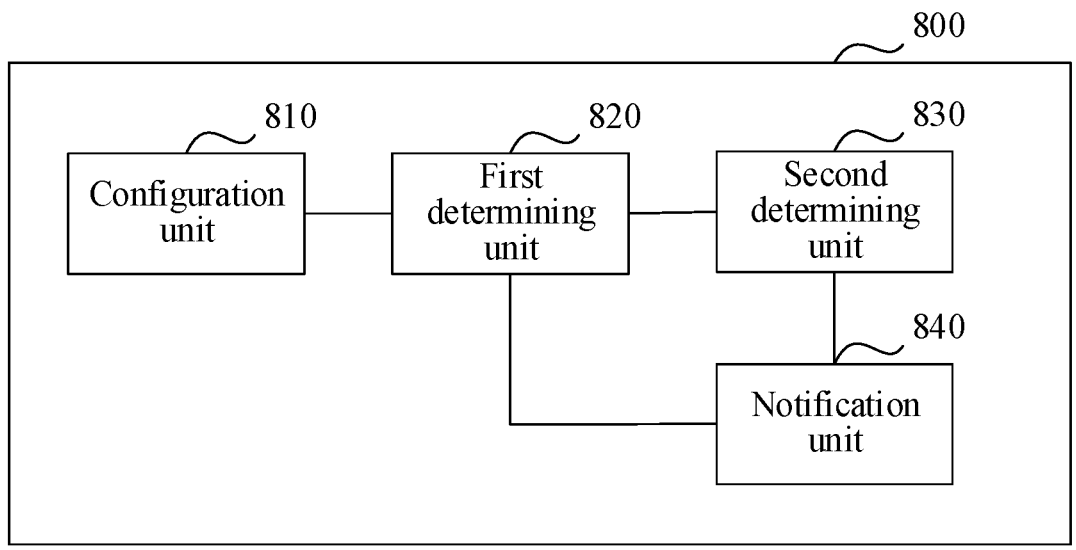
FIG. 8 is a schematic structural diagram of a PUCCH resource allocation apparatus according to an embodiment of the present disclosure.

Refer to FIG. 8, which is a schematic structural diagram of a PUCCH resource allocation apparatus 800 according to an embodiment of the present disclosure. The apparatus is adapted to allocate a PUCCH resource in a CA scenario. In the CA scenario, one PCC is aggregated with at least two SCCs, and feedback information of a downlink transmission block sent by each SCC is fed back over a PUCCH of the PCC. Therefore, a PUCCH resource configured for the PCC needs to be allocated to the SCCs aggregated with the PCC for use. The apparatus provided by this embodiment is adapted to solve a problem of how to effectively use a PUCCH resource during the resource allocation.

As shown in FIG. 8, the apparatus 800 includes a configuration unit 810, a first determining unit 820, a second determining unit 830, and a notification unit 840. The configuration unit 810 is adapted to configure a PUCCH resource for the PCC, where the PUCCH resource includes multiple code channel groups, and each code channel group includes multiple code channel pairs. The first determining unit 820 is adapted to allocate a same code channel group in the PUCCH resource configured for the PCC to two or more SCCs. The second determining unit 830 is adapted to allocate code channel pairs in the same code channel group to the two or more SCCs, where the code channel pairs allocated to the two or more SCCs do not overlap. The notification unit 840 is adapted to notify the two or more SCCs of the code channel group and the code channel pairs that are allocated to the two or more SCCs.

The apparatus may be located in a base station in which the PCC is located, and to be more specific, may be a baseband board, which controls the PCC, in the base station, and to be further specific, may further be a processor on the baseband board. The processor herein may be one processor, or may be a collective name of multiple processing elements.

A resource configuration manner of the configuration unit 810 and a notification manner of the notification unit 840 are the same as those in the foregoing method embodiments, and details are not provided herein again.

After the configuration unit 810 configures the PUCCH resource for the PCC, these resources may be allocated, by using the first determining unit 820, to the SCCs aggregated with the PCC. That is, the first determining unit 820 not only can allocate the code channel group to the two or more SCCs, but also can allocate a code channel group to another SCC aggregated with the PCC. Preferably, the PUCCH resource may be allocated to the SCCs aggregated with the PCC, so as to achieve a goal that a code channel group is shared by as few SCCs as possible. In this case, when a quantity of the SCCs aggregated with the PCC is greater than a quantity of code channel groups in the PUCCH resource, the first determining unit 820 may allocate the same code channel group in the PUCCH resource configured for the PCC to the two or more SCCs. Further, when the quantity of the SCCs aggregated with the PCC is greater than the quantity of the code channel groups in the PUCCH resource, and less than twice the quantity of the code channel groups in the PUCCH resource, the first determining unit 820 may allocate the same code channel group in the PUCCH resource configured for the PCC to two SCCs. For details, reference may be made to the foregoing method embodiments, and details are not provided herein again.

For an SCC that shares the same code channel group, a resource allocation granularity of the SCC needs to be further divided into a code channel pair to avoid a resource conflict, which may be specifically implemented by the second determining unit 830. In addition, the second determining unit 830 may use a manner of allocation according to a requirement, an equal allocation manner, or a cyclic allocation manner. For details, refer to the foregoing method embodiments, and details are not provided herein again.

Figure 9:
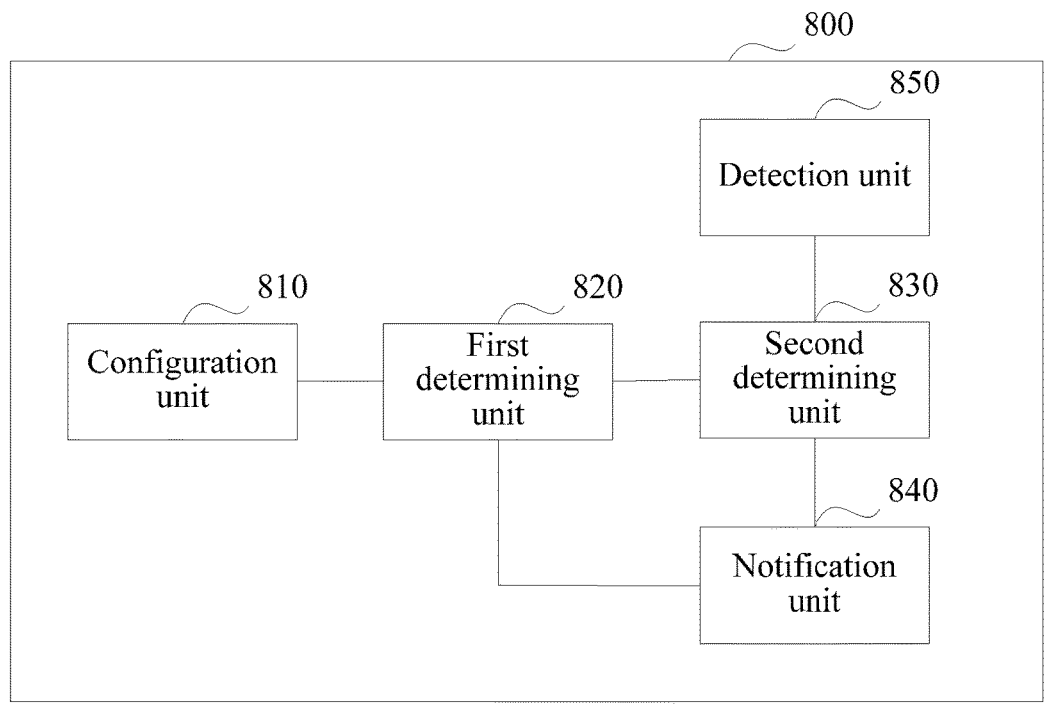
FIG. 9 is a schematic structural diagram of another PUCCH resource allocation apparatus according to an embodiment of the present disclosure.

Continue to refer to FIG. 9, which is a schematic structural diagram of another PUCCH resource allocation apparatus according to an embodiment of the present disclosure. As shown in FIG. 9, when the manner of allocation according to a requirement is used, the apparatus may further include a detection unit 850, adapted to detect load of the two or more SCCs. In this case, the second determining unit 830 is specifically adapted to determine, according to the load of the two or more SCCs, proportions or quantities of the code channel pairs used by the two or more SCCs; and allocate, according to the determined proportions or quantities, non-overlapping code channel pairs in the same code channel group to the two or more SCCs.

When the equal allocation manner is used, the second determining unit 830 is specifically adapted to: equally allocate the code channel pairs in the same code channel group to the two or more SCCs; or when code channel pairs in the same code channel group cannot be equally allocated according to the quantity of the two or more SCCs, remove a remaining quantity of code channel pairs, equally allocate other code channel pairs to the two or more SCCs, and then allocate the remaining quantity of code channel pairs to a remaining quantity of SCCs, so that a difference between quantities of code channel pairs allocated to the SCCs does not exceed one.

When the cyclic allocation manner is used, the second determining unit 830 is specifically adapted to: allocate, in each sub-period in one cycle period according to a proportion in a proportion set, different code channel pairs in the same code channel group to the two or more SCCs, where a proportion used in each sub-period is different, and a quantity of sub-periods in one cycle period is equal to a quantity of proportions in the proportion set. The proportion set may be set according to a quantity of the code channel pairs in the code channel group. The sub-period uses a TTI as a unit, and may be one or more TTIs.

For each of the foregoing manners, reference may be made to the description in the foregoing method embodiments, and details are not provided herein again.

Figure 10:
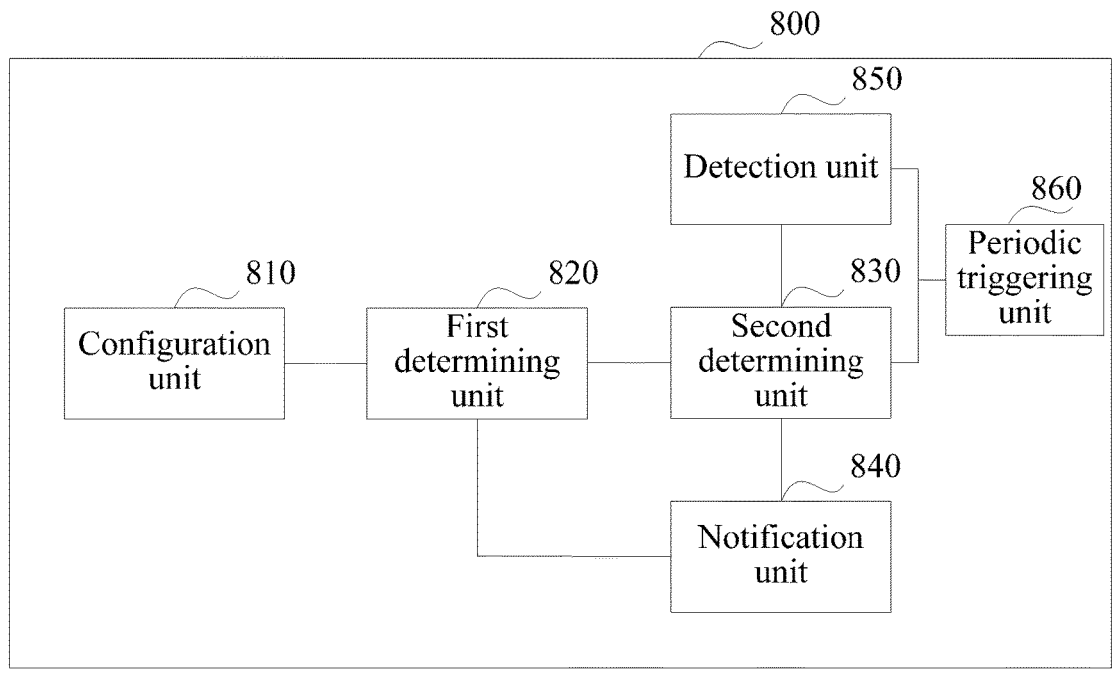
FIG. 10 is a schematic structural diagram of another resource allocation apparatus according to an embodiment of the present disclosure.

The cyclic allocation manner is an implementation manner of adjusting periodically allocation of a code channel pair. For the manner of allocation according to a requirement and the equal allocation manner, after initial allocation is performed by using either one of the two allocation manners, the load of these SCCs may also be detected in each period; and if the load changes, whether to adjust the quantities of the code channel pairs allocated to the SCCs may be considered. Specifically, refer to FIG. 10, which is a schematic structural diagram of still another PUCCH resource allocation apparatus according to an embodiment of the present disclosure. As shown in FIG. 10, the apparatus further includes a periodic triggering unit 860, adapted to: trigger periodically the detection unit 850 to detect the load of the two or more SCCs; and when the load of the two or more SCCs changes, trigger the second determining unit 830 to determine, according to load obtained after the change, proportions or quantities of the code channel pairs used by the two or more SCCs; and when the determined proportions or quantities vary, reallocate, according to the proportions or quantities obtained after the change, non-overlapping code channel pairs in the same code channel group to the two or more SCCs. Next, the two or more SCCs need to be further notified, by using the notification unit 840, of the code channel pairs reallocated to the two or more SCCs; in this case, the code channel group may not need to be notified. The period in which the periodic triggering unit performs triggering uses a TTI as a unit, and may be one or more TTIs.

It should be noted that the configuration unit 810 may be an independently disposed processor, may also be implemented by integration into a processor of a base station, and may also be stored in a memory of the base station in a form of program code, so that a processor of the base station invokes and performs the function of the configuration unit 810. Implementation of the first determining unit 820 and the second determining unit 830 may be the same as that of the configuration unit 810; and the first determining unit 820 and the second determining unit 830 may be integrated together with the configuration unit 810, or may be implemented independently. The notification unit 840 may be an interface. For example, when the PCC and the SCC are located in different base stations, the notification unit 840 may be an interface circuit such as an X2 interface circuit or an S1 interface circuit between the base stations, and may even be an air interface. When the PCC and the SCC are located in a same base station, the notification unit 840 may be a cabling connection interface. The detection unit 850 may be an independently disposed detection circuit, may also be implemented by integration into a processor of a base station, and may also be stored in a memory of the base station in a form of program code, so that a processor of the base station invokes and performs the function of the detection unit 850. The periodic triggering unit 860 may be an independently disposed timer, may also be implemented by integration into a processor of a base station, and may also be stored in a memory of the base station in a form of program code, so that a processor of the base station invokes and performs the function of the periodic triggering unit 860. The base station herein refers to the base station in which the PCC is located, and the processor may be a central processing unit (CPU), or an application specific integrated circuit (ASIC), or one or more integrated circuits adapted to implement the embodiments of the present disclosure.

Figure 11:
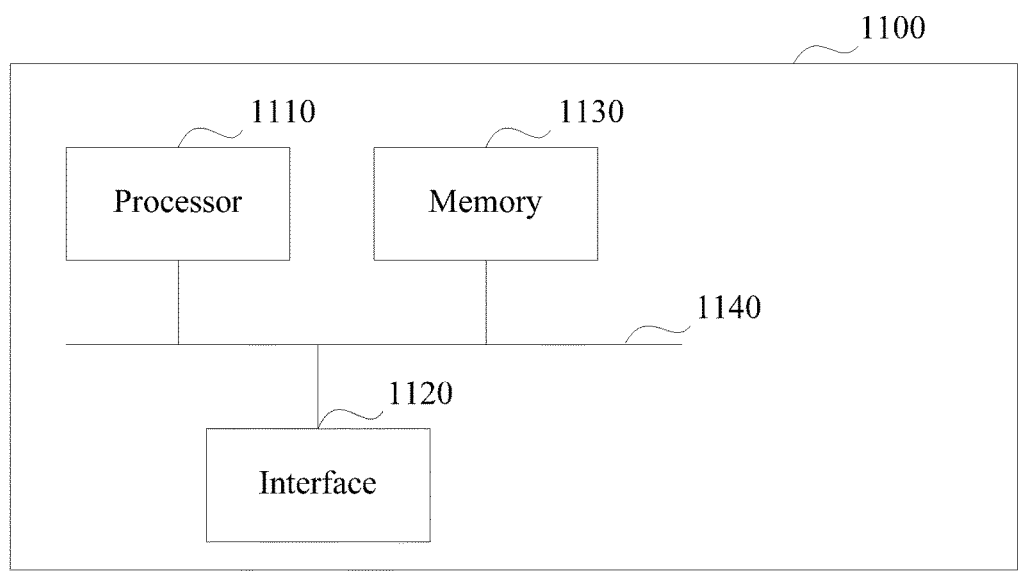
FIG. 11 is a schematic structural diagram of a resource allocation apparatus according to an embodiment of the present disclosure.

Refer to FIG. 11, which is a schematic structural diagram of yet another PUCCH resource allocation apparatus according to an embodiment of the present disclosure. The apparatus is adapted to allocate a PUCCH resource in a CA scenario. In the CA scenario, one PCC is aggregated with at least two SCCs, and feedback information of a downlink transmission block sent by each SCC is fed back over a PUCCH of the PCC. Therefore, a PUCCH resource configured for the PCC needs to be allocated to the SCCs aggregated with the PCC for use. The apparatus provided by this embodiment is adapted to solve a problem of how to effectively use a PUCCH resource during the resource allocation.

As shown in FIG. 11, the apparatus includes a processor 1110 and an interface 1120. The figure further shows a memory 1130 and a bus 1140. The processor 1110, the interface 1120, and the memory 1130 are connected and complete mutual communication by using the bus 1140.

The apparatus is located in a base station in which the PCC is located, and the processor 1110 is adapted to perform any one of the methods, which are performed by the entity for controlling the PCC, in the foregoing method embodiments. For example, the method includes: configuring a PUCCH resource for the PCC, where the PUCCH resource includes multiple code channel groups, and each code channel group includes multiple code channel pairs; allocating a same code channel group in the PUCCH resource configured for the PCC to two or more SCCs; allocating code channel pairs in the same code channel group to the two or more SCCs, where the code channel pairs allocated to the two or more SCCs do not overlap; and notifying, by using the interface 1120, the two or more SCCs of the code channel group and the code channel pairs that are allocated to the two or more SCCs.

It should be noted that the processor 1110 herein may be one processor, or may be a collective name of multiple processing elements. For example, the processor may be a central processing unit (CPU), or may be an ASIC, or one or more integrated circuits adapted to implement the embodiments of the present disclosure, such as one or more microprocessors (digital signal processor, DSP) or one or more field programmable gate arrays (FPGA).

When the PCC and the SCC are located in different base stations, the interface 1120 may be an interface circuit such as an X2 interface circuit or an S1 interface circuit between the base stations, and may even be an air interface. When the PCC and the SCC are located in a same base station, the interface 1120 may be a cabling connection interface.

The memory 1130 may be a storage apparatus, or may be a collective name of multiple storage elements; and the memory 1130 is adapted to store executable program code or a parameter, data, and the like required for running of an access network management device. In addition, the memory 1130 may include a random access memory (RAM), and may also include a non-volatile memory (non-volatile memory), for example, a magnetic disk memory, a flash memory (Flash), or the like.

The bus 1140 may be an industry standard architecture (ISA) bus, a peripheral component interconnect (PCI) bus, an extended industry standard architecture (EISA) bus, or the like. The bus 1140 may be classified into an address bus, a data bus, a control bus, and the like. For ease of description, in FIG. 11, the bus 1140 is represented by only one line, but it does not mean that there is only one bus or one type of bus.

The processor 1110 may further perform the detection step and the step of reallocating a code channel pair in the foregoing method embodiments. For details, refer to the foregoing method embodiments, and details are not provided herein again.

Figure 12:
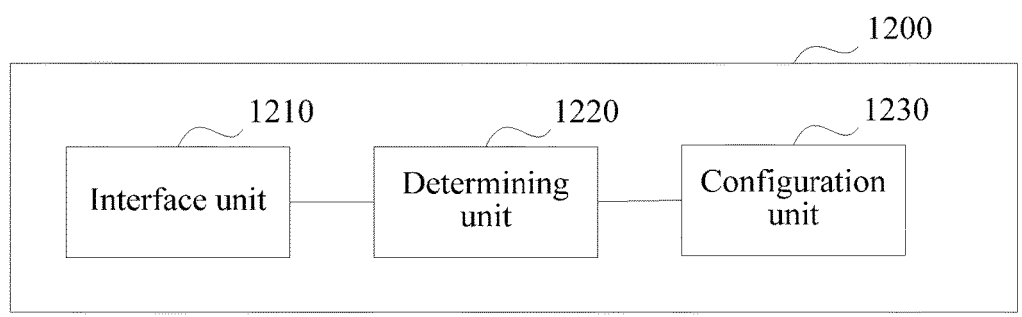
FIG. 12 is a schematic structural diagram of a resource allocation apparatus according to an embodiment of the present disclosure.

Refer to FIG. 12, which is a schematic structural diagram of a resource allocation apparatus 1200 according to an embodiment of the present disclosure. The apparatus is adapted to allocate a PUCCH resource in a CA scenario. In the CA scenario, one PCC is aggregated with at least two SCCs, and feedback information of a downlink transmission block sent by each SCC is fed back over a PUCCH of the PCC. As shown in FIG. 12, the apparatus 1200 includes an interface unit 1210, a determining unit 1220, and a configuration unit 1230. The interface unit 1210 is adapted to receive resource information sent by an entity for controlling the PCC, where the resource information is used to indicate a code channel group allocated to the SCC and a code channel pair that is used by the SCC and is in the code channel group, the SCC and other one or more SCCs share the code channel group allocated to the SCC, and the used code channel pair does not overlap with code channel pairs used by the other one or more SCCs. The determining unit 1220 is adapted to determine, according to the received resource information, a code channel pair that can be used by the SCC and is in the code channel group allocated to the SCC. The configuration unit 1230 is adapted to configure the determined code channel pair for UE on the SCC.

The apparatus may be located in a base station in which the SCC is located, and to be more specific, may be a baseband board, which controls the SCC, in the base station, and to be further specific, may further be a processor on the baseband board. The processor herein may be one processor, or may be a collective name of multiple processing elements.

It should be noted that the interface unit 1210 may be an interface. For example, when the PCC and the SCC are located in different base stations, the interface unit 1210 may be an interface circuit such as an X2 interface circuit or an S1 interface circuit between the base stations, and may even be an air interface. When the PCC and the SCC are located in a same base station, the interface unit 1210 may be a cabling connection interface. The determining unit 1220 may be an independently disposed processor, may also be implemented by integration into a processor of a base station, and may also be stored in a memory of the base station in a form of program code, so that a processor of the base station invokes and performs the function of the determining unit 1220. Implementation of the configuration unit 1230 is the same as that of the determining unit 1220; and the configuration unit 1230 may be integrated together with the determining unit 1220, or may be implemented independently. The base station herein refers to the base station in which the SCC is located, and the processor may be a central processing unit (CPU), or an application specific integrated circuit (ASIC), or one or more integrated circuits adapted to implement the embodiments of the present disclosure.

Figure 13:
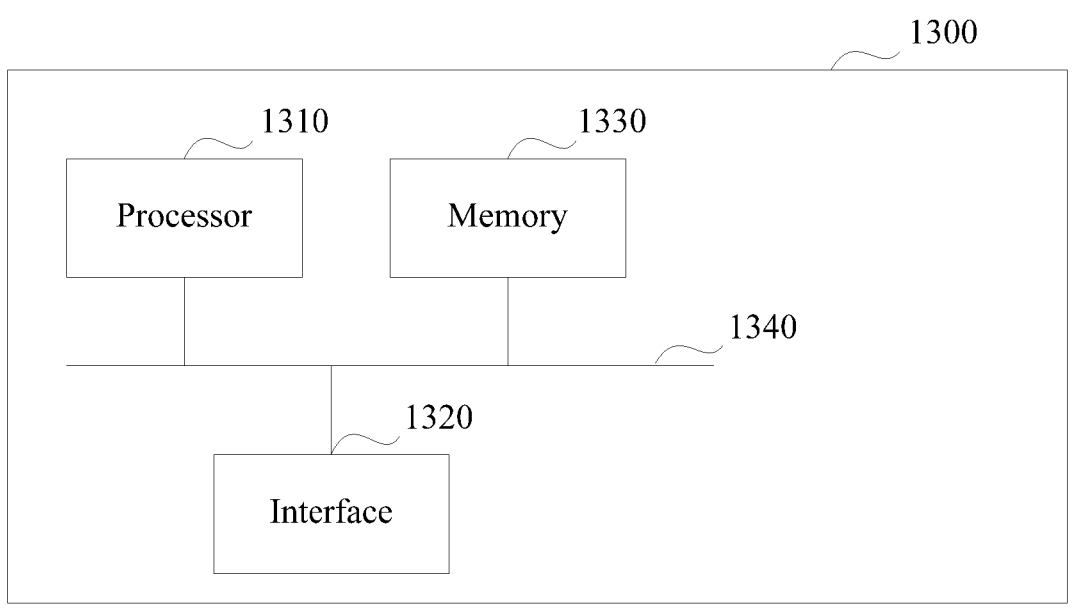
FIG. 13 is a schematic structural diagram of a resource allocation apparatus according to an embodiment of the present disclosure.

Refer to FIG. 13, which is a schematic structural diagram of still yet another PUCCH resource allocation apparatus according to an embodiment of the present disclosure. The apparatus is adapted to allocate a PUCCH resource in a CA scenario. In the CA scenario, one PCC is aggregated with at least two SCCs, and feedback information of a downlink transmission block sent by each SCC is fed back over a PUCCH of the PCC. Therefore, a PUCCH resource configured for the PCC needs to be allocated to the SCCs aggregated with the PCC for use. The apparatus provided by this embodiment is adapted to solve a problem of how to effectively use a PUCCH resource during the resource allocation.

As shown in FIG. 13, the apparatus includes a processor 1310 and an interface 1320. The figure further shows a memory 1330 and a bus 1340. The processor 1310, the interface 1320, and the memory 1330 are connected and complete mutual communication by using the bus 1340.

The apparatus is located in a base station in which the SCC is located, and the processor 1310 is adapted to perform any one of the methods, which are performed by the entity for controlling the SCC, in the foregoing method embodiments. For example, the method includes: receiving, by using the interface 1320, resource information sent by an entity for controlling the PCC, where the resource information is used to indicate a code channel group allocated to the SCC and a code channel pair that is used by the SCC and is in the code channel group, the SCC and other one or more SCCs share the code channel group allocated to the SCC, and the used code channel pair does not overlap with code channel pairs used by the other one or more SCCs; determining a code channel pair that can be used by the SCC and is in the code channel group allocated to the SCC according to the received resource information; and configuring the determined code channel pair for UE on the SCC.

It should be noted that the processor 1310 herein may be one processor, or may be a collective name of multiple processing elements. For example, the processor may be a central processing unit (CPU), or may be an application specific integrated circuit (ASIC), or one or more integrated circuits adapted to implement the embodiments of the present disclosure, such as one or more microprocessors (digital signal processor, DSP) or one or more field programmable gate arrays (FPGA).

When the SCC and the PCC are located in different base stations, the interface 1320 may be an interface circuit such as an X2 interface circuit or an S1 interface circuit between the base stations, and may even be an air interface. When the SCC and the PCC are located in a same base station, the interface 1320 may be a cabling connection interface.

The memory 1330 may be a storage apparatus, or may be a collective name of multiple storage elements; and the memory 1330 is adapted to store executable program code or a parameter, data, and the like required for running of an access network management device. The memory 1330 may include a random access memory (RAM), and may also include a non-volatile memory (non-volatile memory), for example, a magnetic disk memory, a flash memory (Flash), or the like.

The bus 1340 may be an industry standard architecture (ISA) bus, a peripheral component interconnect (PCI) bus, an extended industry standard architecture (EISA) bus, or the like. The bus 1340 may be classified into an address bus, a data bus, a control bus, and the like. For ease of description, in FIG. 13, the bus 1340 is represented by only one line, but it does not mean that there is only one bus or one type of bus.

Embodiment 1: A resource allocation method is used to allocate a PUCCH resource in a CA scenario. In the CA scenario, one PCC is aggregated with at least two SCCs, and feedback information of a downlink transmission block sent by each SCC is fed back over a PUCCH of the PCC. The method includes:

configuring a PUCCH resource for the PCC, where the PUCCH resource includes multiple code channel groups, and each code channel group includes multiple code channel pairs;

allocating a same code channel group in the PUCCH resource configured for the PCC to two or more SCCs;

allocating code channel pairs in the same code channel group to the two or more SCCs, where the code channel pairs allocated to the two or more SCCs do not overlap; and notifying the two or more SCCs of the code channel group and the code channel pairs that are allocated to the two or more SCCs.

Embodiment 2: According to the method in Embodiment 1, the allocating a same code channel group in the PUCCH resource configured for the PCC to two or more SCCs includes:

when a quantity of the SCCs aggregated with the PCC is greater than a quantity of code channel groups in the PUCCH resource, allocating the same code channel group in the PUCCH resource configured for the PCC to the two or more SCCs.

Embodiment 3: According to the method in Embodiment 2, the allocating a same code channel group in the PUCCH resource configured for the PCC to two or more SCCs includes:

when the quantity of the SCCs aggregated with the PCC is greater than the quantity of the code channel groups in the PUCCH resource, and less than twice the quantity of the code channel groups in the PUCCH resource, allocating the same code channel group in the PUCCH resource configured for the PCC to two SCCs.

Embodiment 4:According to the method in any one of Embodiments 1 to 3, the allocating code channel pairs in the same code channel group to the two or more SCCs, where the code channel pairs allocated to the two or more SCCs do not overlap includes:

detecting load of the two or more SCCs;

determining, according to the load of the two or more SCCs, proportions or quantities of the code channel pairs used by the two or more SCCs; and allocating, according to the determined proportions or quantities, non-overlapping code channel pairs in the same code channel group to the two or more SCCs.

Embodiment 5: According to the method in any one of Embodiments 1 to 3, the allocating code channel pairs in the same code channel group to the two or more SCCs, where the code channel pairs allocated to the two or more SCCs do not overlap includes:

allocating equally the code channel pairs in the same code channel group to the two or more SCCs; or when code channel pairs in the same code channel group cannot be equally allocated according to the quantity of the two or more SCCs, removing a remaining quantity of code channel pairs, allocating equally other code channel pairs to the two or more SCCs, and then allocating the remaining quantity of code channel pairs to a remaining quantity of SCCs, so that a difference between quantities of code channel pairs allocated to the SCCs does not exceed one.

Embodiment 6: According to the method in any one of Embodiments 1 to 5, the method further includes:

detecting periodically the load of the two or more SCCs;

when the load of the two or more SCCs changes, determining, according to load obtained after the change, proportions or quantities of the code channel pairs used by the two or more SCCs;

when the determined proportions or quantities vary, reallocating, according to the proportions or quantities obtained after the change, non-overlapping code channel pairs in the same code channel group to the two or more SCCs; and notifying the two or more SCCs of the code channel pairs reallocated to the two or more SCCs.

Embodiment 7: According to the method in Embodiment 6, the period in which the load of the two or more SCCs is detected uses a TTI as a unit.

Embodiment 8: According to the method in any one of Embodiments 1 to 3, the allocating code channel pairs in the same code channel group to the two or more SCCs, where the code channel pairs allocated to the two or more SCCs do not overlap includes:

allocating, in each sub-period in one cycle period according to a proportion in a proportion set, different code channel pairs in the same code channel group to the two or more SCCs, where a proportion used in each sub-period is different, and a quantity of sub-periods in one cycle period is equal to a quantity of proportions in the proportion set.

Embodiment 9: According to the method in Embodiment 8, the sub-period uses a TTI as a unit.

Embodiment 10: A resource allocation method is used to allocate a PUCCH resource in a CA scenario. In the CA scenario, one PCC is aggregated with at least two SCCs, and feedback information of a downlink transmission block sent by each SCC is fed back over a PUCCH of the PCC. The method includes:

receiving, by an entity for controlling the SCC, resource information sent by an entity for controlling the PCC, where the resource information is used to indicate a code channel group allocated to the SCC and a code channel pair that is used by the SCC and is in the code channel group, the SCC and other one or more SCCs share the code channel group allocated to the SCC, and the used code channel pair does not overlap with code channel pairs used by the other one or more SCCs;

determining, by the entity for controlling the SCC, a code channel pair that can be used by the SCC and is in the code channel group allocated to the SCC according to the received resource information; and configuring, by the entity for controlling the SCC, the determined code channel pair for UE on the SCC.

Embodiment 11: A resource allocation apparatus is adapted to allocate a PUCCH resource in a CA scenario. In the CA scenario, one PCC is aggregated with at least two SCCs, and feedback information of a downlink transmission block sent by each SCC is fed back over a PUCCH of the PCC. The apparatus includes:

a configuration unit, adapted to configure a PUCCH resource for the PCC, where the PUCCH resource includes multiple code channel groups, and each code channel group includes multiple code channel pairs;

a first allocation unit, adapted to allocate a same code channel group in the PUCCH resource configured for the PCC to two or more SCCs;

a second allocation unit, adapted to allocate code channel pairs in the same code channel group to the two or more SCCs, where the code channel pairs allocated to the two or more SCCs do not overlap; and a notification unit, adapted to notify the two or more SCCs of the code channel group and the code channel pairs that are allocated to the two or more SCCs.

Embodiment 12: According to the apparatus in Embodiment 11, the first allocation unit is adapted to: when a quantity of the SCCs aggregated with the PCC is greater than a quantity of code channel groups in the PUCCH resource, allocate the same code channel group in the PUCCH resource configured for the PCC to the two or more SCCs.

Embodiment 13: According to the apparatus in Embodiment 12, the first allocation unit is adapted to: when the quantity of the SCCs aggregated with the PCC is greater than the quantity of the code channel groups in the PUCCH resource, and less than twice the quantity of the code channel groups in the PUCCH resource, allocate the same code channel group in the PUCCH resource configured for the PCC to two SCCs.

Embodiment 14: According to the apparatus in any one of Embodiments 11 to 13, the apparatus further includes a detection unit, adapted to detect load of the two or more SCCs, and the second allocation unit is adapted to:

determine, according to the load of the two or more SCCs, proportions or quantities of the code channel pairs used by the two or more SCCs; and allocate, according to the determined proportions or quantities, non-overlapping code channel pairs in the same code channel group to the two or more SCCs.

Embodiment 15: According to the apparatus in any one of Embodiments 11 to 13, the second allocation unit is adapted to:

equally allocate the code channel pairs in the same code channel group to the two or more SCCs; or when code channel pairs in the same code channel group cannot be equally allocated according to the quantity of the two or more SCCs, remove a remaining quantity of code channel pairs, equally allocate other code channel pairs to the two or more SCCs, and then allocate the remaining quantity of code channel pairs to a remaining quantity of SCCs, so that a difference between quantities of code channel pairs allocated to the SCCs does not exceed one.

Embodiment 16: According to the apparatus in any one of Embodiments 11 to 15, the apparatus further includes:

a periodic triggering unit, adapted to: trigger periodically the detection unit to detect the load of the two or more SCCs; and when the load of the two or more SCCs changes, trigger the second allocation unit to determine, according to load obtained after the change, proportions or quantities of the code channel pairs used by the two or more SCCs; and when the determined proportions or quantities vary, reallocate, according to the proportions or quantities obtained after the change, non-overlapping code channel pairs in the same code channel group to the two or more SCCs; and the notification unit is further adapted to notify the two or more SCCs of the code channel pairs reallocated to the two or more SCCs.

Embodiment 17: According to the apparatus in Embodiment 16, the period in which the periodic triggering unit performs triggering uses a TTI as a unit.

Embodiment 18: According to the apparatus in any one of Embodiments 11 to 13, the second allocation unit is adapted to:

allocate, in each sub-period in one cycle period according to a proportion in a proportion set, different code channel pairs in the same code channel group to the two or more SCCs, where a proportion used in each sub-period is different, and a quantity of sub-periods in one cycle period is equal to a quantity of proportions in the proportion set.

Embodiment 19: According to the apparatus in Embodiment 18, the sub-period uses a TTI as a unit.

Embodiment 20: A resource allocation apparatus is adapted to allocate a PUCCH resource in a CA scenario. In the CA scenario, one PCC is aggregated with at least two SCCs, and feedback information of a downlink transmission block sent by each SCC is fed back over a PUCCH of the PCC. The apparatus includes:

an interface unit, adapted to receive resource information sent by an entity for controlling the PCC, where the resource information is used to indicate a code channel group allocated to the SCC and a code channel pair that is used by the SCC and is in the code channel group, the SCC and other one or more SCCs share the code channel group allocated to the SCC, and the used code channel pair does not overlap with code channel pairs used by the other one or more SCCs;

a determining unit, adapted to determine, according to the received resource information, a code channel pair that can be used by the SCC and is in the code channel group allocated to the SCC; and a configuration unit, adapted to configure the determined code channel pair for UE on the SCC.

Persons skilled in the art should understand that the embodiments of the present disclosure may be provided as a method, an apparatus (a device), or a computer program product. Therefore, the present disclosure may use a form of a complete hardware embodiment, a complete software embodiment, or an embodiment combining software and hardware. Moreover, the present disclosure may use a form of a computer program product that is implemented on one or more computer-usable storage media (including, but not limited to, a disk memory, a CD-ROM, an optical memory, and the like) that include computer-usable program code.

The present disclosure is described with reference to the flowcharts and/or block diagrams of the method, the apparatus (the device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may also be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some exemplary embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Apparently, persons skilled in the art can make various modifications and variations to the present disclosure without departing from the scope of the present disclosure. In this way, the present disclosure is intended to cover these modifications and variations provided that these modifications and variations to the present disclosure fall within the scope of the claims of the present disclosure and their equivalent technologies.

What is claimed is:

1. A resource allocation method, used to allocate a physical uplink control channel (PUCCH) resource in a component carrier aggregation scenario, wherein the component carrier comprises a primary component carrier (PCC) and a secondary component carrier (SCC), and the method comprises:
    configuring a PUCCH resource for the PCC, wherein the PUCCH resource comprises at least two PUCCH code channel groups, and each PUCCH code channel group comprises at least two PUCCH code channel pairs;
    determining a PUCCH resource allocated to the SCC, wherein a same code channel group in the PUCCH resource configured for the PCC is allocated to at least two SCCs; and
    determining code channel pairs used by the SCCs to which the same code channel group in the PUCCH resource configured for the PCC is allocated, wherein any two SCCs among the SCCs to which the same code channel group in the PUCCH resource configured for the PCC is allocated use non-overlapping code channel pairs.

2. The method according to claim 1, wherein the determining code channel pairs used by the SCCs to which the same code channel group in the PUCCH resource configured for the PCC is allocated, wherein any two SCCs among the SCCs to which the same code channel group in the PUCCH resource configured for the PCC is allocated use non-overlapping code channel pairs comprises:
    detecting load of the SCCs to which the same code channel group in the PUCCH resource configured for the PCC is allocated;
    determining, according to the load of the SCCs to which the same code channel group in the PUCCH resource configured for the PCC is allocated, proportion or quantities of the code channel pairs used by the SCCs to which the same code channel group in the PUCCH resource configured for the PCC is allocated, wherein an SCC with higher load uses a larger proportion or quantity of code channel pairs; and
    determining, according to the determined proportions or quantities, the code channel pairs used by the SCCs to which the same code channel group in the PUCCH resource configured for the PCC is allocated, wherein any two SCCs among the SCCs to which the same code channel group in the PUCCH resource configured for the PCC is allocated use non-overlapping code channel pairs.

3. The method according to claim 2, wherein the detecting load of the SCCs to which the same code channel group in the PUCCH resource configured for the PCC is allocated comprises:
    detecting periodically the load of the SCCs to which the same code channel group in the PUCCH resource configured for the PCC is allocated.

4. The method according to claim 3, wherein the period is one or more transmission time intervals (TTIs).

5. The method according to claim 1, wherein the determining code channel pairs used by the SCCs to which the same code channel group in the PUCCH resource configured for the PCC is allocated, wherein any two SCCs among the SCCs to which the same code channel group in the PUCCH resource configured for the PCC is allocated use non-overlapping code channel pairs comprises:
    allocating equally code channel pairs in the same code channel group to the SCCs to which the same code channel group in the PUCCH resource configured for the PCC is allocated; or
    when code channel pairs in the same code channel group cannot be equally allocated according to a quantity of the SCCs to which the same code channel group in the PUCCH resource configured for the PCC is allocated, allocating the code channel pairs in the same code channel group to the SCCs, wherein a difference between quantities of code channel pairs allocated to the SCCs does not exceed one.

6. The method according to claim 1, wherein the determining code channel pairs used by the SCCs to which the same code channel group in the PUCCH resource configured for the PCC is allocated, wherein any two SCCs among the SCCs to which the same code channel group in the PUCCH resource configured for the PCC is allocated use non-overlapping code channel pairs comprises:
    determining, in each sub-period in one cycle period according to a proportion in a proportion set, that the SCCs to which the same code channel group in the PUCCH resource configured for the PCC is allocated use different code channel pairs in the same code channel group, wherein a proportion used in each sub-period is different, and a quantity of sub-periods in one cycle period is equal to a quantity of proportions in the proportion set.

7. The method according to claim 6, wherein the sub-period is one or more TTIs.

8. A resource allocation apparatus, adapted to allocate a physical uplink control channel (PUCCH) resource in a component carrier aggregation scenario, wherein the component carrier comprises a primary component carrier (PCC) and a secondary component carrier (SCC), and the apparatus comprises:
- a memory, adapted to store program code;
- a processor, adapted to execute the program code stored in the memory, and execute:
  - configuring a PUCCH resource for the PCC, wherein the PUCCH resource comprises at least two PUCCH code channel groups, and each PUCCH code channel group comprises at least two PUCCH code channel pairs;
  - determining a PUCCH resource allocated to the SCC, wherein a same code channel group in the PUCCH resource configured for the PCC is allocated to at least two SCCs; and
  - determining code channel pairs used by the SCCs to which the same code channel group in the PUCCH resource configured for the PCC is allocated, wherein any two SCCs among the SCCs to which the same code channel group in the PUCCH resource configured for the PCC is allocated use non-overlapping code channel pairs; and
- an interface, adapted to transmit information between the memory and the processor.

9. The apparatus according to claim 8, wherein the processor is adapted to execute:
- detecting load of the SCCs to which the same code channel group in the PUCCH resource configured for the PCC is allocated;
- determining, according to the load of the SCCs to which the same code channel group in the PUCCH resource configured for the PCC is allocated, proportions or quantities of the code channel pairs used by the SCCs to which the same code channel group in the PUCCH resource configured for the PCC is allocated, wherein an SCC with higher load uses a larger proportion or quantity of code channel pairs; and determining, according to the determined proportions or quantities, the code channel pairs used by the SCCs to which the same code channel group in the PUCCH resource configured for the PCC is allocated, wherein any two SCCs among the SCCs to which the same code channel group in the PUCCH resource configured for the PCC is allocated use non-overlapping code channel pairs.

10. The apparatus according to claim 9, wherein the processor is adapted to execute detecting periodically the load of the SCCs to which the same code channel group in the PUCCH resource configured for the PCC is allocated.

11. The apparatus according to claim 10, wherein the period is one or more transmission time intervals (TTIs).

12. The apparatus according to claim 8, wherein the processor is adapted to execute:
- allocating equally code channel pairs in the same code channel group to the SCCs to which the same code channel group in the PUCCH resource configured for the PCC is allocated; or
- when code channel pairs in the same code channel group cannot be equally allocated according to a quantity of the SCCs to which the same code channel group in the PUCCH resource configured for the PCC is allocated, allocating the code channel pairs in the same code channel group to the SCCs, wherein a difference between quantities of code channel pairs allocated to the SCCs does not exceed one.

13. The apparatus according to claim 8, wherein the processor is adapted to execute:
- determining, in each sub-period in one cycle period according to a proportion in a proportion set, that the SCCs to which the same code channel group in the PUCCH resource configured for the PCC is allocated use different code channel pairs in the same code channel group, wherein a proportion used in each sub-period is different, and a quantity of sub-periods in one cycle period is equal to a quantity of proportions in the proportion set.

14. The apparatus according to claim 13, wherein the sub-period is one or more TTIs.

15. A resource allocation apparatus, adapted to allocate a physical uplink control channel (PUCCH) resource in a component carrier aggregation scenario, wherein the component carrier comprises a primary component carrier (PCC) and a secondary component carrier (SCC), and the apparatus is located in an entity for controlling the SCC and comprises:
- an interface, adapted to receive resource information sent by an entity for controlling the PCC, wherein the resource information is used to indicate a code channel group allocated to the SCC and a code channel pair that is used by the SCC and is in the code channel group, the SCC and other one or more SCCs share the code channel group allocated to the SCC, and the used code channel pair does not overlap with code channel pairs used by the other one or more SCCs;
- a memory, adapted to store program code; and
- a processor, adapted to execute the program code stored in the memory, and execute:
  - determining the code channel pair that used by the SCC and is in the code channel group allocated to the SCC according to the received resource information; and
  - configuring the determined code channel pair for user equipment on the SCC.

* * * * *